United States Patent [19]

Barry et al.

[11] Patent Number: 5,309,246
[45] Date of Patent: May 3, 1994

[54] TECHNIQUE FOR GENERATING ADDITIONAL COLORS IN A HALFTONE COLOR IMAGE THROUGH USE OF OVERLAID PRIMARY COLORED HALFTONE DOTS OF VARYING SIZE

[75] Inventors: Robert V. Barry, Waterport; Joseph Ambro, Rochester, both of N.Y.

[73] Assignee: Eastman Kodak Company, Rochester, N.Y.

[21] Appl. No.: 761,597

[22] Filed: Sep. 18, 1991

[51] Int. Cl.⁵ .................. H04N 1/21; H04N 1/387
[52] U.S. Cl. .................. 358/298; 358/459; 358/515; 358/534
[58] Field of Search .......... 358/298, 75, 76, 77, 358/78, 80, 454, 459, 515, 534, 536, 518, 528

[56] References Cited

U.S. PATENT DOCUMENTS

| | | | |
|---|---|---|---|
| 2,183,524 | 12/1939 | Yule | 95/2 |
| 4,468,692 | 8/1984 | Yamada et al. | 358/76 |
| 4,573,071 | 2/1986 | Sakamoto | 358/76 |
| 4,583,116 | 4/1986 | Hennig et al. | 358/75 |
| 4,642,680 | 2/1987 | Yamada | 358/78 |
| 4,708,459 | 11/1987 | Cowan et al. | 355/4 |
| 4,774,567 | 9/1988 | Stansfield et al. | 358/80 |
| 4,839,722 | 6/1989 | Barry et al. | 358/80 |
| 4,860,026 | 8/1989 | Matsumoto et al. | 346/1.1 |
| 4,884,080 | 11/1989 | Hirahara et al. | 346/46 |
| 4,897,736 | 1/1990 | Sugino | 358/457 |
| 4,918,622 | 4/1990 | Granger et al. | 358/298 X |
| 4,926,248 | 5/1990 | Kobayashi et al. | 358/75 |
| 4,965,672 | 10/1990 | Duke et al. | 358/298 |
| 5,008,742 | 4/1991 | Shigaki et al. | 358/79 |
| 5,016,097 | 5/1991 | Shimano | 358/79 |
| 5,018,085 | 5/1991 | Smith | 364/526 |
| 5,128,699 | 7/1992 | Nakajima et al. | 358/298 X |
| 5,202,772 | 4/1993 | Muir | 358/459 |

Primary Examiner—Benjamin R. Fuller
Assistant Examiner—Eric Frahm
Attorney, Agent, or Firm—Robert L. Randall

[57] ABSTRACT

A technique for use in a direct digital color proofing (DDCP) system (500) for printing a "modelling" color(s) in a halftone color proof image such that the modelling color simulates a ("special") color that does not lie within a gamut of colors reproducible through only primary color (e.g. cyan, magenta, yellow and black) halftone printing. Specifically, a wide range of such modelling colors can be produced by independently and appropriately setting dot size, particularly in combination with solid area density, for the halftone dots (110, 120, 130, 140) produced for different primary colors and then printing the resulting dots on an overlaid dot-on-dot basis with proper registration. Appropriate dot gain and density look-up tables (230, 720; 240, 940) are respectively used to transform continuous tone separation values and bit-mapped data to vary dot size and solid area density of these halftone dots for each such primary color prior to printing these dots using a proofing engine. A unique set of tables is used to produce each different modelling color.

49 Claims, 9 Drawing Sheets

DOT GAIN CURVES

DOT GAIN FUNCTIONS FOR AN ILLUSTRATIVE RECIPE COLOR

FIG. 6A

| | | |
|---:|:---|:---|
| POINTER TO NEXT ENTRY | POINTER TO PRQE | — 605 |
| IMAGE FILE DESCRIPTION | DATA STRUCTURE | — 610 |
| OUTPUT COLOR ORDER | STRING | — 625 |
| SCREEN RULING | FLOAT | — 630 |
| DOT FONT | BYTE | — 635 |
| DESCRIPTION | STRING | — 640 |
| NUMBER OF COPIES | BYTE | — 645 |
| UPPER LEFT HAND CORNER X | INTEGER | — 650 |
| UPPER LEFT HAND CORNER Y | INTEGER | — 655 |
| SCATTER PROOF ENABLE | BOOLEAN | — 660 |
| PRIORITY | BYTE | — 665 |
| EXTRA SEPARATION NAMES [2] | STRING | — 670 |
| RECIPE COLOR NUMBER [2] | STRING | — 675 |
| PASS PARAMETERS [5] | DATA STRUCTURE | — 680 |

PROOF REQUEST 600

FIG. 6B

IMAGE FILE DESCRIPTION

| | | |
|---:|:---|:---|
| CEPS DEVICE NAME | STRING | — 611 |
| JOB NAME | STRING | — 612 |
| PAGE NAME | STRING | — 613 |
| IMAGE NAME | STRING | — 614 |
| CT RESOLUTION | INTEGER | — 615 |
| LW RESOLUTION | INTEGER | — 616 |
| IMAGE HEIGHT | INTEGER | — 617 |
| IMAGE WIDTH | INTEGER | — 618 |
| IMAGE PROCESSING FLAGS | BYTE | — 619 |

PASS PARAMETERS — 681

| | | |
|---:|:---|:---|
| SCREEN ANGLE | FLOAT | |
| DOT GAIN TABLE | STRING | |
| SOLID AREA DENSITY | SIGNED BYTE | — 683 |

IMAGE PROCESSING FLAGS | BYTE | — 619

FLAGS TO ENABLE/DISABLE: SCALE TO FIT
ROTATE IMAGE
MIRROR IMAGE
CONTROL STRIP ENABLE
DATA LEGEND ENABLE

```
       ┌──────────────────────────────────────────────┐
       │ Recipe  Special  Colors  Selection           │
       ├──────────────────────────────────────────────┤
       │                                              │
1000 ──▶│          Create/Modify  Recipe  Special  Color │
       │                                              │
       │         Pnk45                                │
       │         Khak1                                │
FIG. 10│         COLOR312                             │
       │         COLOR122                             │
RECIPE │         COLOR413                             │
COLORS │         COLOR163                             │
SELECTION│       EK Yellow                            │
SCREEN │                                              │
DISPLAY│                                              │
       │   Enter  Recipe  Name:                       │
       │                                              │
       ├──────────────────────────────────────────────┤
       │ function keys:                               │
       │ ┌────┬─────┬──────┬─────┐   ┌────┬────┬────┬───┐ │
       │ │Exit│Enter│Delete│Re-  │   │Copy│Prev│Next│   │ │
       │ │    │     │      │name │   │    │    │    │   │ │
       │ └────┴─────┴──────┴─────┘   └────┴────┴────┴───┘ │
       └──────────────────────────────────────────────┘

┌──────────────────────────────────────────────┐
       │ Recipe  Special  Colors  Setup               │
       ├──────────────────────────────────────────────┤
1100 ──▶│ Recipe  Special  Color  Name:  Pnk45         │
       │                                              │
       │ Recommended Screen Ruling:  4.8              │
       │                                              │
FIG. 11│         Colors (in lay-    Den-    Dot Gain │
       │         down order)        sity    Table    │
RECIPE │         Cyan                +3     Number 9 │
COLORS │         Yellow              -1     Number 6 │
SETUP  │         Magenta              0     MagDotG  │
SCREEN │         Black               +12    StdBP    │
DISPLAY│                                              │
       │                                              │
       ├──────────────────────────────────────────────┤
       │ function keys:                               │
       │ ┌────┬──────┬────┬────┐ ┌──┬──┬──┬────┐      │
       │ │Save│Select│Move│Edit│ │  │  │  │Quit│      │
       │ └────┴──────┴────┴────┘ └──┴──┴──┴────┘      │
       └──────────────────────────────────────────────┘
```

TECHNIQUE FOR GENERATING ADDITIONAL COLORS IN A HALFTONE COLOR IMAGE THROUGH USE OF OVERLAID PRIMARY COLORED HALFTONE DOTS OF VARYING SIZE

TECHNICAL FIELD OF THE INVENTION

The invention relates to direct digital color proofing systems and specifically to a technique for use in such a system for printing additional color(s) in a halftone color image by appropriately setting dot size, particularly in conjunction with solid area density, of primary colored (e.g. cyan, magenta, yellow and black) halftone dots and then overlaying these dots with proper registration.

BACKGROUND ART

Graphic arts applications frequently require the accurate reproduction of a high resolution color image (commonly referred to as an "artwork"), such as a color photograph, a color drawing, a color layout and the like. A typical application might involve printing a high resolution color image or a series of such images on a page of a periodical, such as a magazine, or a corporate annual report.

In order to verify that a conventional color printing process generates a color halftone image that is an accurate reproduction of an original color artwork, a so-called "proof" image is generally made from a series of halftone separations of the artwork. The proof image is taken to be representative of the reproduced halftone image that will be generated by a multi-color printing press. Oftentimes, the proof image contains unexpected and unsightly Moire patterns, poor tone and/or color reproduction, or other artifacts which generally can be removed through appropriate rotation of a screen angle used in generating one or more of the separations or through appropriate color corrections. Once these adjustments are made, new separations are produced. Thereafter, the entire proofing process is iteratively repeated until a set of separations is found which will yield an acceptable depiction of the artwork.

The conventional iterative manual photographic process of producing an acceptable set of halftone separations, due to the inherent variability of the process, can be very tedious and inordinately time consuming. Unfortunately, in the graphic arts industry, publication deadlines are often extremely tight and afford very little, if any, leeway. Consequently, the available time in a graphic arts production environment allotted to a color technician to generate a set of halftone separations to meet a particular publication deadline, for example, is often insufficient to allow the technician adequate time, due to the trial and error nature of iterative process, to generate that set of separations which produces a very high quality halftone color image. As such, the technician is often constrained by time pressures to produce a set of separations that produces a visually acceptable, though not necessarily a very high quality, image.

In an effort aimed at reducing the time required and accompanying expense associated with the proofing process, the art has turned away from conventional manual photographic based proofing processes, particularly for use in high volume graphic arts applications, to other technologies. One of the first such technologies was electro-photography based proofing; an illustrative system employing this technology is described in U.S. Pat. No. 4,708,459 (issued to C. Cowan et al on Nov. 24, 1987 and assigned to the present assignee hereof—hereinafter referred to as the '459 Cowan et al patent). While this system does produce an excellent quality proof, this system appears to possess various limitations which, to a certain extent, have restricted its commercial attractiveness.

Specifically, many printing presses today utilize five or six differently colored inks. Typically, four of these inks are the primary colors: cyan, magenta, yellow and black (C,Y,M,K), with two additional inks being so-called "special" fifth and sixth colors. For the most part, printing presses fix the density at which a single colored halftone dot is printed, i.e. either the press deposits a fixed quantity of ink at a particular location on a page or not. As such, it has become apparent in the art for quite some time that a significant number of colors, such as for example phosphorescents (e.g. "hot pink"), pastels and golds, will fall outside the bounds of a gamut of colors that can be printed using only these four primary colors at fixed density levels. Accordingly, these colors, hereinafter referred to as "special" colors, can not be readily reproduced through the use of fixed density halftone printing using the four primary colored inks alone. As such, whenever such a special color is desired, an ink that has been specifically mixed to that color is generally used as either the fifth or sixth colored ink. Using that ink, the special color is printed in accordance with the halftone dot patterns on a corresponding separation for that color of an original artwork. In addition, from time to time, a printing job may call for an exact color, such as illustratively so-called "KODAK" yellow, that lies within the gamut associated with the four primary colors. ("KODAK" is a registered trademark of the Eastman Kodak Company of Rochester, New York.) However, to provide higher quality color reproductions and increased reliability of the color reproduction process than that generally obtainable through use of only fixed density primary color printing, a fifth or sixth ink that has been mixed to that specific color will be used, rather than the primary colors, to tone corresponding areas of each halftone reproduction.

In view of the use of five and six color halftone color printing, a concomitant need has arisen for some time in the art to be able to model both the fifth and sixth colors within a proof image. Generally speaking, this modelling could be accomplished through either of two approaches. First, one approach might be to produce a separate film within the proofing process for each special color that is to be used and then use an ink that has been matched to that color to tone corresponding halftone dot patterns therefor in the proof image. Unfortunately, this approach is likely to be quite expensive and cumbersome to implement and use. Fortunately, a reasonably close, rather than an exact, match is often adequate for use in analyzing a proof image for defects, particularly when a viewer is concerned with page layout, i.e. the areas on the proofed image in which corresponding portions of the replicated artwork are to appear, and the like. Accordingly, a second approach might be to produce a corresponding resultant color in some fashion through use of the four primary colors which, while being a reasonably close rather than an exact match to each special color, will nevertheless represent each of the special colors that is to be used.

The electro-photographic proofing system described in the '459 Cowan et al patent permits an operator to independently set the solid area density, over a reasonably wide range, of the halftone dots for each primary color. In this manner, dots of a different solid area density can be produced for each different primary color in a given proof image. Then, by accurately superimposing the primary colored halftone dots with different corresponding solid area densities in a common proof image, an extended range of colors, at least to a human observer, can be produced for use in simulating a special color(s). Unfortunately, in practice, this range, while greater than that obtainable without varying the solid area density between dots of different primary colors, nevertheless proved to be somewhat inadequate for use in modelling various special colors.

For a variety of reasons, such as for example, increased flexibility, control and throughput over that provided by electro-photographic proofing systems, the art is currently turning towards the use of so-called direct digital color proofing (DDCP) systems. These systems directly generate a halftone color proof image from a set of digitized continuous tone (contone) separations. Specifically, DDCP systems manipulate the separations in digital form to electronically generate appropriate halftone separations, including, inter alia, electronic screening and dot gain compensation, and then directly write the proof image using an appropriate marking engine (also referred to herein as a "proofing engine").

Therefore, a need presently exists in the art for a technique for inclusion in a DDCP system that can be used to model, not necessarily exactly, a wide range of special color(s) in a halftone color proof image through use of the available, illustratively four, different primary process colors (C,Y,M,K) and specifically halftone dots formed of these individual primary colors. Specifically, such a technique should significantly expand the range of special colors that can be modelled in a color proof image over that heretofore obtainable in the art, such as through electro-photographic technologies, as well as be compatible with digital marking engines.

DISCLOSURE OF THE INVENTION

Accordingly, an object of the present invention is to provide a technique for use in a direct digital color proofing (DDCP) system that can model a special color, such as a fifth or sixth color, by using only primary colored, e.g. cyan, magenta, yellow, black (C,Y,M,K), halftone dots.

A specific object is to provide such a technique that can significantly expand the range of special colors that can be modelled over that previously possible in the art.

Another specific object is to provide such a technique that is not only compatible with digital marking engines but is also very easy and inexpensive to implement and use, particularly in a DDCP system.

These and other objects are advantageously accomplished in accordance with the teachings of our invention by varying the dot size of the halftone dots for each different primary color and particularly by varying the solid area density of these dots as well, and then, with these variations, writing these dots on an overlaid, e.g. dot-on-dot, basis.

We have found that since a human eye spatially integrates overlaid primary colored halftone dot patterns to perceive a resultant color therefor, variations in both solid area density and dot size will yield a significantly increased range, i.e. a much wider offering, of colors than that which would result by merely varying the solid area density of each overlaid dot. Accordingly, through our invention, halftone dots of independently, though appropriately, varying size and, particularly varying solid area density as well, are overlaid with accurate registration, on a dot-on-dot basis, to generate a color (hereinafter referred to as either a "modelling" or "recipe" color) that simulates each desired special color. The amount of variation in solid area density and dot size, the latter viewed as dot gain, from one primary color to the next is determined by the particular special color that is to be modelled in a proof image and the specific recipe color that is to be generated therefor.

In accordance with a preferred embodiment of our invention, each recipe color is formed using a set of primary colored continuous tone (contone) separation data files that collectively form separation data for the corresponding special color in the image to be proofed. These data files provide the same type of primary colored contone separation data as would normally be used in printing the "non-special" colors in the proof image. However, to generate halftone dot patterns for each recipe color, two separate dot size and density look-up tables are used to appropriately adjust the size and solid area density of the contone separation data for the special color separation files and, by doing so, appropriately vary the size and solid area density of the resulting primary colored halftone dots. A unique set of dot size and solid area density look-up tables exists for each special color that is to be modelled. Furthermore, this set contains separate dot size and density tables for each primary color that is to be used to generate each recipe color.

Specifically, the dot size table, which is addressed with each contone value from a contone separation data file imparts a pre-defined amount of dot gain to each of these values so as to properly vary the corresponding dot size therefor and thereby generate modified contone values. For a particular recipe color, this look-up table stores a separate pre-defined dot gain function for each primary color that is to be used to produce that recipe color. The resulting contone values produced by the dot size look-up table are then electronically screened, which includes appropriate processing through, for example, an electronic dot generator and font table, to yield appropriate binary bit-mapped values that collectively define halftone dots. These binary values are then routed through a density look-up table. This latter table is accessed using each bit-mapped binary value to vary the exposure level of a laser used in the proofing engine to generate a writing spot therefor and hence vary the solid area density of each such resulting halftone dot. The dot size table preferably exists within a raster image processor (RIP) which accepts incoming contone files from any one of a variety of color electronic pre-press systems (CEPSs) and which performs data de-interleaving, screening, dot generation and other image data processing operations; while the density table is preferably situated in the proofing engine itself.

Through the use of separate dot size and density look-up tables for each primary color, the size and solid area density of each primary colored halftone dot can be independently varied in order to yield a rich offering of potential recipe colors. Furthermore, by transforming separation data using pre-stored values situated in look-up tables to yield each recipe color, the percentage contribution of each primary color in the resulting overlaid halftone dot structure and hence the resultant recipe color so formed can be readily changed by merely varying the contents of the look-up tables.

Our invention also possesses the feature, through use in a DDCP system, that any combination of primary colors can be successively printed in any desired lay-down order to yield colored halftone dots of corresponding dot size and solid area density which have been overlaid in that order. For example, if a recipe color only requires cyan and yellow dots, then only these two colors would be printed. In addition, rather than printing cyan halftone data first, yellow halftone data could be printed first with cyan being printed second, and so on for other color orders. By permitting any combination of the available primary colors to be used in any desired lay-down order, an increasingly broad offering of recipe colors can be readily and easily produced through use of our invention.

BRIEF DESCRIPTION OF THE DRAWINGS

The teachings of the present invention may be readily understood by considering the following detailed description in conjunction with the accompanying drawings, in which:

FIG. 5 depicts the correct alignment of the drawing sheets for FIGS. 5A and 5B;

FIG. 6A depicts the data structure of a proof request used in DDCP system 500 shown in FIGS. 5A and 5B;

FIG. 6B depicts the structure of image file description field 610 situated within proof request (queue element) 600 shown in FIG. 6;

FIG. 6C depicts image processing flags field 619 that forms part of image file description field 610 shown in FIG. 6A;

FIG. 6D depicts the structure of each one of pass parameters fields 680 situated within proof request 600 shown in FIG. 6A;

FIG. 10 depicts recipe colors selection screen display 1000, that is generated at operator PC 520 situated within DDCP system 500 shown in FIGS. 5A and 5B, for use by an operator in listing those recipe colors for which definitional data is stored on raster image processor 510, creating a file of data for a new recipe color or selecting such a file for an existing recipe color that is to be modified; and FIG. 11 depicts recipe color setup screen display 1100, that is generated at operator PC 520 shown in FIGS. 5A and 5B, for use by the operator in entering data for a new recipe color or editing a file for an existing and selected recipe color.

To facilitate understanding, identical reference numerals have been used, where possible, to denote identical elements that are common to various figures.

MODES OF CARRYING OUT THE INVENTION

Figure 1:
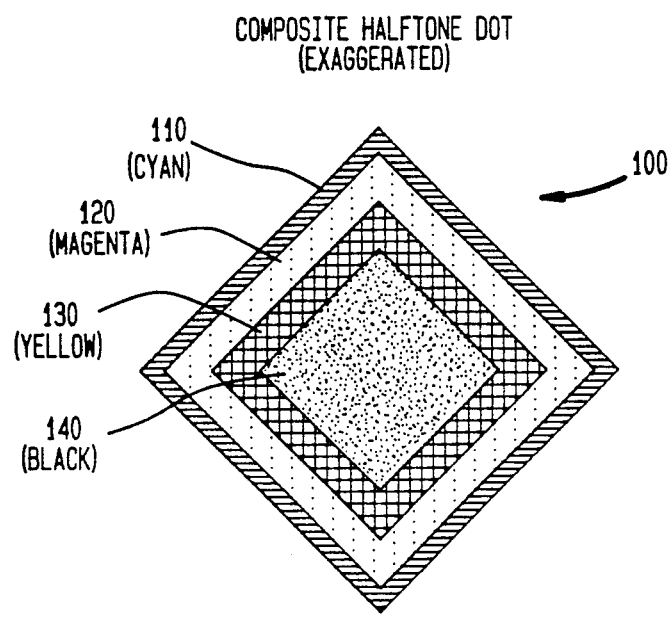
FIG. 1 depicts the structure of composite halftone dot 100 formed in accordance with our inventive teachings for a given recipe color.

After reading the following description, those skilled in the art will readily appreciate that the teachings of our invention can be applied to any of a wide variety of different types of color digital images, such as illustratively proof images or digital prints, as well as to either halftone or continuous tone (contone) imaging, to create a recipe color from a limited number of colorants used in printing any such image. Primarily speaking, our invention is directed to halftone imaging wherein a significantly expanded range of colors can be provided by dot-on-dot halftone printing of primary colored dots of appropriate size and density. However, our inventive teachings can also be used in contone printing to create recipe colors by overlaying primary contone colors of appropriately varied density values though without any size variation. Moreover, the teachings of our invention can be used not only with a cyan, yellow, magenta and black (C,Y,M,K) color gamut used in halftone printing but with many other color gamuts as well. For ease of explanation, our invention will now be described in the context of use within a direct digital color proofing system (DDCP) for creating a recipe color in a digital color proof image using the C,Y,M,K color gamut.

In accordance with our broad inventive teachings, we have found that a wide range of colors can be obtained in a color proof image by varying the dot size of the halftone dots for each different primary color and particularly, to further expand the range, by varying the solid area density of each of these dots as well and then, with these variations, accurately printing these dots on an overlaid dot-on-dot basis. By doing so, a large range of so-called "recipe" (or modelling) colors can be achieved in the proof to simulate "special" colors that can be printed using multi-color, e.g. five or six, color printing presses, but which are not situated within the C,Y,M,K color gamut. In particular, we have found that since a human eye spatially integrates overlaid primary colored halftone dot patterns to perceive a resultant color therefor, variations in both solid area density and dot size will yield a significantly increased range of recipe colors than that which can be produced by merely varying the solid area density of each overlaid dot.

Accordingly, through our invention, halftone dots of independently, though appropriately, varying dot size, particularly in conjunction with solid area density variations, are overlaid with accurate registration, on a dot-on-dot basis, to generate each recipe color. The amount of variation in solid area density and dot size, the latter viewed as dot gain, from one primary color to the next is determined by the specific recipe color that is to be generated in the proof image and that is to model (i.e. simulate) a corresponding special color in an original image being proofed. While the recipe color, based on C,Y,M,K colorants, will not exactly match a special color situated beyond the C,Y,M,K gamut, the resulting recipe color will nevertheless simulate the special color.

FIG. 1 depicts the structure of a composite halftone dot formed in accordance with our inventive teachings for a given recipe color. As shown, composite halftone dot 100, having a dot size of 100%, is formed by overlaid dot-on-dot printing, using separate toning passes, of primary colored component halftone dots 110, 120, 130 and 140 which have different corresponding dot sizes and density levels. Dot 100 is shown grossly exaggerated in size for purposes of illustration. As an example, component dots 110, 120, 130 and 140 are respectively a cyan dot with approximately a 100% dot size and a 95% solid area density; a magenta dot with approximately an 80% dot size and a 90% solid area density; a yellow dot with approximately a 50% dot size and an 80% solid area density; and a black dot with approximately a 25% dot size and a 40% solid area density. Composite dot 100 is printed with a lay-down order of cyan dot 110 first, followed by magenta dot 120, then yellow dot 130 and finally black dot 140. While composite dot 100 and its component halftone dots are all illustratively diamond shaped, a wide variety of other dot fonts, such as for example round or oval shaped dots, can be used instead. Moreover, while composite dot 100 is shown as being composed of four primary colored component halftone dots, a different number of such component dots could also be used and in any desired order. Inasmuch as a DDCP system, such as system 500 shown in FIGS. 5A–5B and described below, also permits a colored media to be used, the color of the media itself can be used as an additional color component in forming a composite dot, though, as far as its use an an additional color component is concerned, the solid area density and size associated therewith would be fixed.

To achieve different recipe colors, the dot size as well as the solid area density of each component dot can be independently varied on a continuous basis, as desired, from 0–100%. These variations permit the contribution of each primary color to be adjusted proportionally over its entire tone reproduction range in order to achieve tints of the same color hue.

Figure 2:
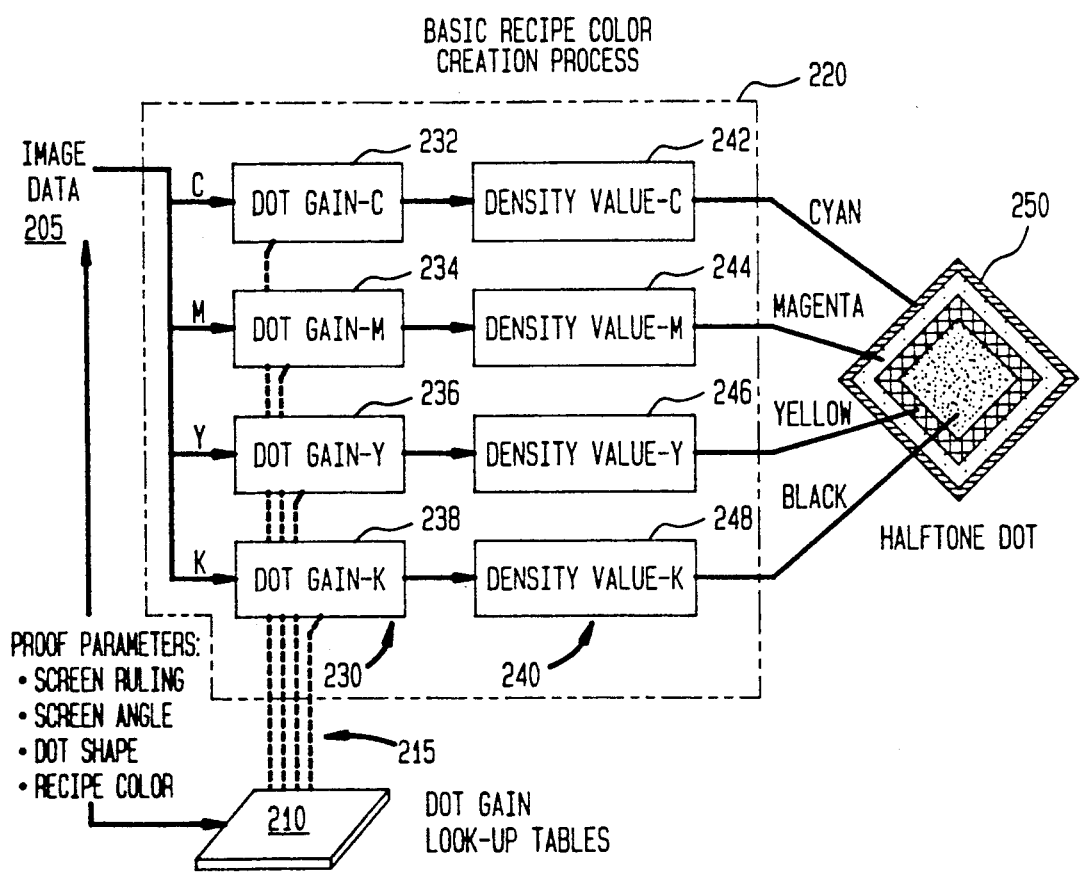
FIG. 2 depicts a simplified high level block diagram of our inventive method for forming recipe colors using overlaid halftone dots of varying dot size and solid area density.

A simplified high level block diagram of our inventive method for forming recipe colors using overlaid halftone dots of varying dot size and solid area density is depicted in FIG. 2. Each recipe color is formed using a set of primary colored (C,Y,M,K) contone separation data files for that particular recipe color. For each primary color that is to be used in generating a recipe color, each successive value in the separation file for that primary color is effectively transformed through two successive look-up tables, specific to that primary color, to impart the needed variation in halftone dot size and solid area density to the resulting component halftone dots for that primary color. These look-up tables contain empirically determined data which, based upon the incoming contone separation values and desired recipe color, provide appropriate settings for dot gain and solid area density for each primary colored component halftone dot.

Specifically, incoming image data 205 for a given set of C,Y,M,K separation files for a special color is routed into processing and printing block 220 which, in turn, generates halftone bit-mapped data that when printed, on a dot-on-dot basis, forms illustrative composite halftone dot 250. Inasmuch as block 220 provides a number of image processing functions, such as inter alia translation of interleaved CEPS (color electronic pre-press system) data files, de-interleaving of the CEPS data files into constituent C,Y,M,K separation files and electronic screening, and digital color image printing, that do not form part of our specific invention, all these functions have been omitted to simplify the drawing and facilitate reader understanding of our invention.

As shown, processing block 220 contains four dot gain look-up tables 230 (collectively formed of cyan dot gain table 232, magenta dot gain table 234, yellow dot gain table 236 and black dot gain table 238) and four solid area density look-up tables 240 (collectively formed of cyan density table 242, magenta density table 244, yellow density table 246 and black density table 248). Contone C,Y,M,K separation values are supplied to the input of the corresponding cyan, yellow, magenta and black dot gain tables. Each of these tables is loaded with a pre-defined dot gain function which imparts an appropriate variation, in terms of dot gain, to the dot size for the corresponding primary color. For example, if a cyan component halftone dot for a given recipe color required a dot gain of 10% for a 50% input dot, then, for this sized dot, table 232 would produce a contone value corresponding to a dot size of 60%, and so forth for other variations in dot size. The modified outputs of C,Y,M,K dot gain tables 232, 234, 236 and 238, after, among other operations, being electronically screened and thus converted into appropriate halftone dot patterns, are fed to respective C,Y,M,K density tables 242, 244, 246 and 248. Specifically, the value of each binary bit that is to form a halftone dot for a given primary color is applied as input to a corresponding density table. Based upon its value, the corresponding table generates either one of two pre-defined multi-bit values to set the exposure level of a laser used in the proofing engine so as to produce the corresponding writing spot with a proper level of darkness and hence vary the solid area density of each component halftone dot partially formed by these spots, such as the component dots which collectively form dot 250. The density can vary in a relative range of 0.2D to 2.0D. Changing density alone permits recipe colors of different hues to be produced.

To properly configure a DDCP system to generate a desired color proof image, the system, as discussed in detail below, relies on use of a proof request that contains various parameters that specify, among other items, screen ruling, screen angle, dot shape and recipe color(s) to be used to generate that image. Inasmuch as the system typically stores empirically based dot gain functions for a relatively large number of special colors, in symbolically tables 210, the system will load, as symbolized by dashed lines 215, tables 230 from table 210 with values for the dot gain functions needed for a corresponding recipe color, i.e. of the primary colors required therefor, immediately prior to processing contone values for an incoming proof request that employs that recipe color. As discussed below, the DDCP system provides an operator with the ability to add, change (such as by using different empirical data values) and delete any recipe color from the system which, in turn, will appropriately change the contents of table 210. In addition, the DDCP system stores as part of the specification for each recipe color, the solid area density correction value for each constituent primary color. The DDCP system also loads the appropriate primary color density correction values into tables 240 immediately prior to printing a corresponding proof image. While these values are typically fixed for each primary color, appropriate empirically determined functions can be used instead with their values being stored into a table (not shown), similar to table 210, and subsequently loaded into tables 240, as needed.

As will be seen below, dot gain tables 230 exist within a raster image processor (RIP) in the DDCP system wherein the RIP accepts incoming contone files from any one of a variety of color electronic pre-press systems (CEPSs) and which performs data de-interleaving, screening, dot generation and other image data processing operations; while density tables 240 are situated in the proofing engine itself used in the DDCP system.

Figure 3:
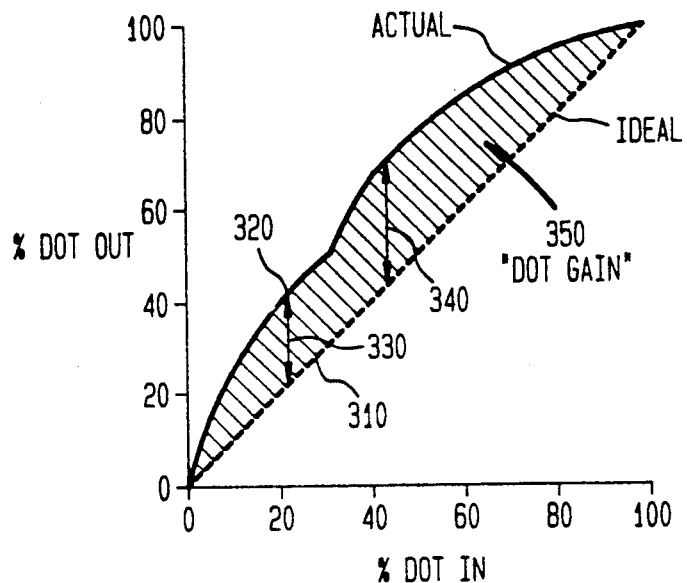
FIG. 3 depicts a graph of ideal and typical versions of dot gain curves as known in the art.
Figure 4:
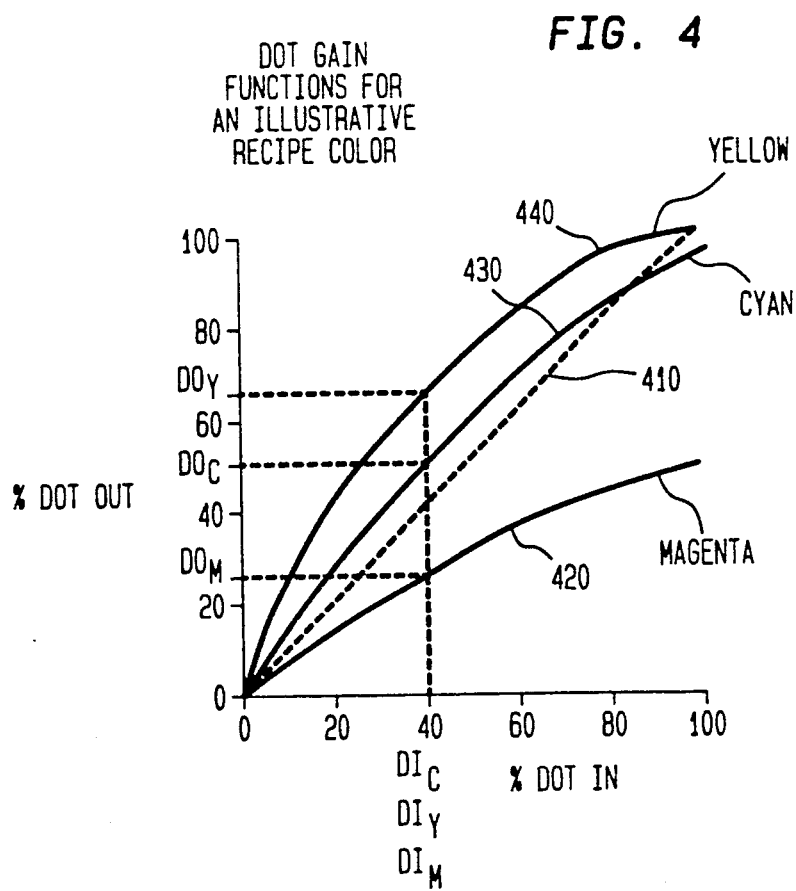
FIG. 4 depicts graphs of dot gain functions for specifying the dot size of various primary color halftone dots that are to be overlaid in accordance with our inventive teachings to form a particular recipe color.

To understand dot gain and the contents of dot gain tables 230 which are used to form a given recipe color, consider FIGS. 3 and 4.

FIG. 3 depicts a graph of ideal and typical versions of dot gain curves for a single color, as known in the art. Dot gain is a well known phenomena in halftone printing and refers to an apparent change in size of a printed halftone dot from its input size. This change typically results from the tendency of ink to spread after it has been deposited on paper as well as to various optical effects that make a dot appear larger than it actually is. Dot gain is typically measured in terms of dot area and can cause an increase (or decrease) in dot area for a given input dot area. Dot area is measured in terms of 0% to 100% with 100% indicating a desired maximum sized dot. For no dot gain as symbolized by dashed line 310, an input dot will produce, on a 1:1 basis, the same size output dot. However, due to dot gain, a relationship between dot input size and actual output dot size may not be linear and, in fact, often varies based on the input dot size as indicated by illustrative curve 320. Dot gain, being area 350, is viewed as the percentage change in area for an output dot relative to a given size input dot. For curves 310 and 320, the dot gain is given by region 350. Inasmuch as dot gain is typically specified for a given percentage input dot size, dot gain for a 20% input dot is shown by line 330 and for a 40% input dot by line 340.

Now, to generate a recipe color, the dot in/dot out relationship is intentionally changed to vary the dot size of the dots produced for each primary colored component halftone dot. As such, FIG. 4 depicts graphs of dot gain functions for varying the dot size of various primary color halftone dots that are to be overlaid to form a particular recipe color.

The particular recipe color utilizes overlaid cyan, yellow and magenta halftone dots with their dot gain functions being given by lines 430, 440 and 420. For purposes of ready comparison, an ideal (null) 1:1 dot gain function is shown by dashed line 410. For each input dot size, i.e. each different contone value in each of these primary color separations for the corresponding special color, these dot gain curves specify the output dot size to use for each such primary color so that the resulting primary colored component halftone dots, once superimposed and printed on an accurate dot-on-dot basis with the appropriate solid area density levels, will produce the desired recipe color. For example, for equal sized 40% input dots for cyan, yellow and magenta ($DI_C$, $DI_Y$, $DI_M$), the recipe color would be formed of approximately a 50% cyan output dot ($DO_C$), a 65% yellow output dot ($DO_Y$) and a 28% magenta output dot ($DO_M$), and so on for other input dot size values regardless of whether these input values are equal or unequal for the individual primary colors. In defining each recipe color to the DDCP system, the digitized values of the full corresponding dot gain curve for each different primary color used to form that recipe color are provided to the system and then stored therein for subsequent use in loading each corresponding dot gain look-up table, when needed. Though dot gain functions normally start at 0% and terminate at 100%, there is no such requirement in generating dot gain functions for component halftone dots to be used in depicting a recipe color. These dot gain curves, as well as the accompanying solid area density correction values discussed above, are empirically determined using procedures well known in the art to yield an appropriate recipe color for each special color that is to be simulated in a color proof image.

Figure 5A:
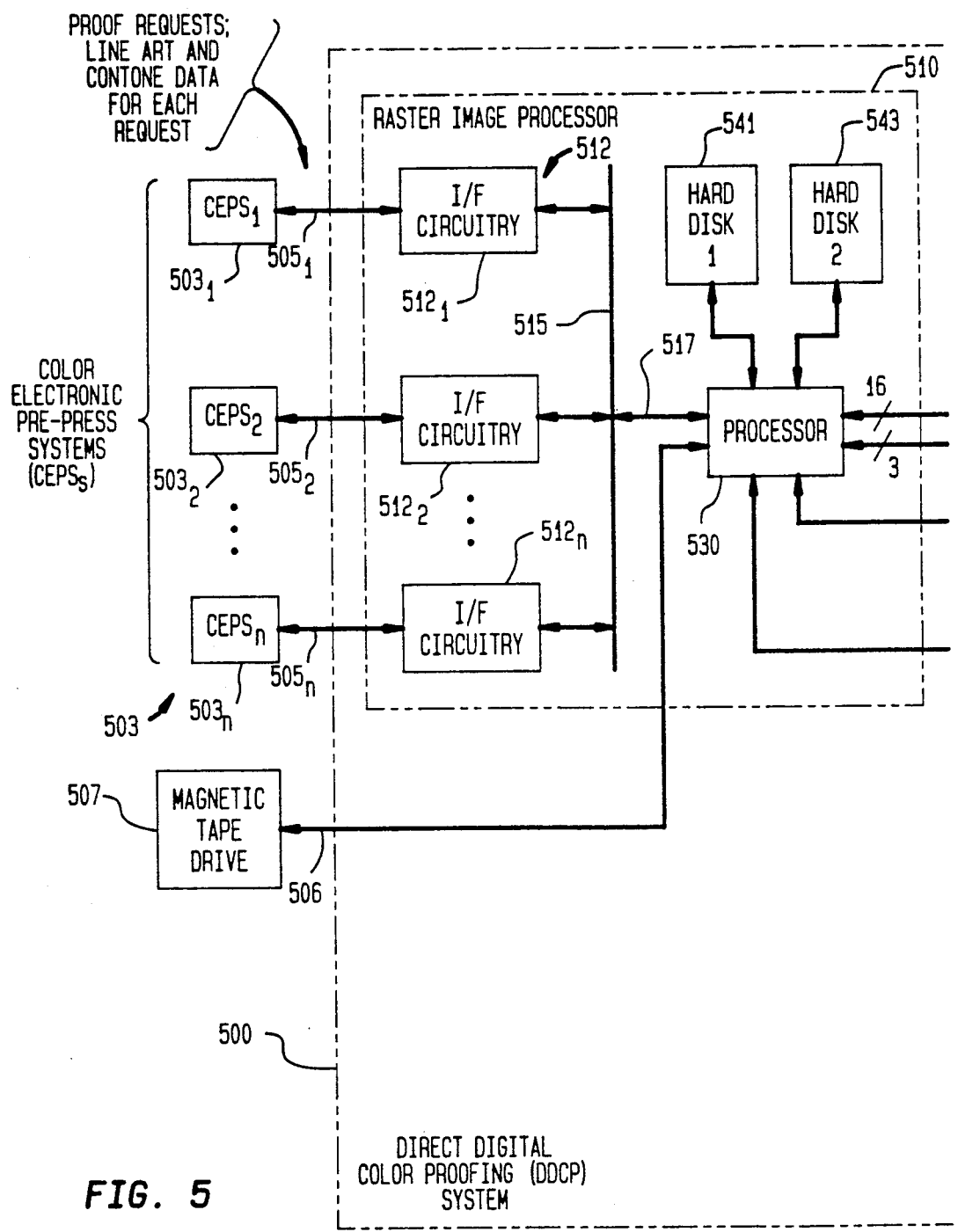
FIGS. 5A and 5B collectively depict a high level block diagram of Direct Digital Color Proofing (DDCP) system 500 that utilizes our invention to generate recipe colors on a digital proof image.
Figure 5B:
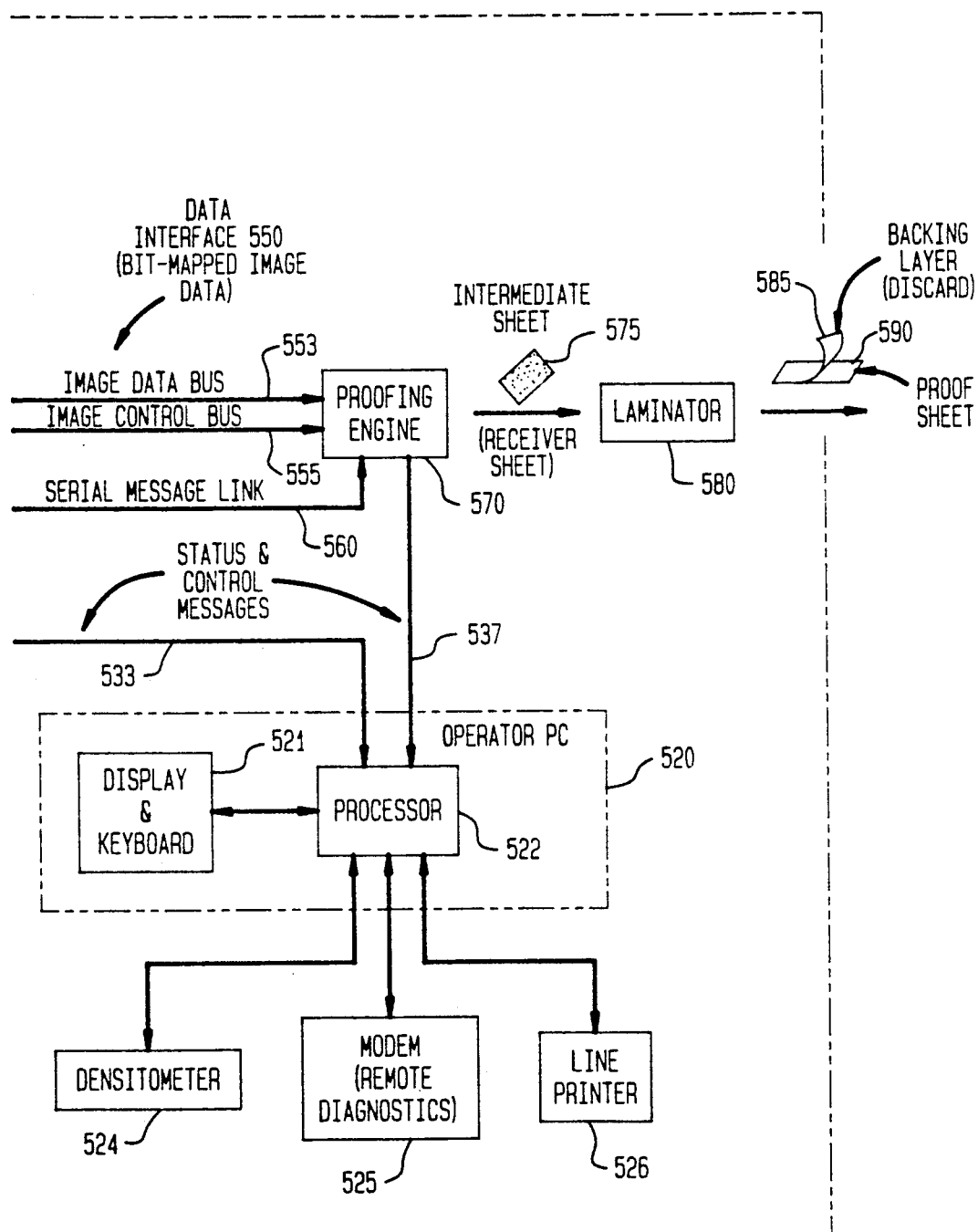

With the above in mind, the remainder of the discussion will now address the specific manner through which our invention is implemented within an illustrative DDCP system. In this regard, FIGS. 5A and 5B collectively depict a block diagram of DDCP system 500 which utilizes our invention for printing recipe colors. The correct alignment of the drawing sheets for these figures is shown in FIG. 5. For the purposes of brevity, only those aspects of this DDCP system that are germane to a full understanding of the implementation and/or use of our invention will be specifically discussed hereinbelow.

As shown, DDCP system 500 is connected to and obtains contone image data, via lines $505_1$, $505_2$, ..., $505_n$, for an original image from any one of a number of color electronic pre-press systems (CEPSs) $503_1$, $503_2$, ..., $503_n$ that collectively form CEPSs 503. In essence, DDCP system 500 processes the contone image data for each image and generates an accompanying color proof image therefor on, for example, a paper medium. The resulting proof image after being transferred to the paper medium is referred to as a "proof sheet". Contone image data can also be previously recorded on magnetic tape and, through magnetic tape drive 507, provided to DDCP system 500 for proofing.

The data provided by each CEPS is in the form of a file of successive contone values which, for each successive pixel within an image, are formed of interleaved contone values for the individual separation colors, e.g. values for cyan, yellow, magenta, and black (C,Y,M and K), therefor. A similarly interleaved separation file is provided for each special color that is to appear in the image. Each of CEPSs 503 can be any one of a number of current commercially available color electronic pre-press systems.

In general, for any image to be proofed, DDCP system 500 digitally manipulates the contone separation values provided by any of the CEPSs by first de-interleaving these values into individual contone separation files, then digitally generates a halftone separation file for each of the individual contone separations by, for example, inter alia, electronic screening and dot gain compensation, and then directly writes a composite color proof image for all these halftone separations using the proofing engine. This processing is the same for all the separation files, regardless of whether the particular file is for a special color or not. However, if the interleaved file is for a special color, then this processing also includes dot gain and solid area density transformation in accordance with the teachings of our present invention. A proof request, as discussed below, specifies the name of the particular recipe color that is to be used to simulate a corresponding special color.

DDCP system 500 contains raster image processor (RIP) 510; proofing engine (PE) 570; operator personal computer (PC) 520 and its associated peripherals: densitometer 524, remote diagnostic modem 525 and line printer 526; and laminator 580. Each of CEPSs $503_1$, $503_2, \ldots, 503_n$ is connected within RIP 510 through an appropriate hardware interface $512_1, 512_2, \ldots, 512_n$, which collectively form interfaces 512, to CEPS bus 515 which, in turn, is connected to processor 530. This processor is a conventional microcomputer system. Hard disks 541 and 543 (also denoted as hard disks 1 and 2) are also connected to processor 530 and provide temporary storage of processed halftone image data generated by this processor. Each of these hard disks contains an image file, with both of these disks collectively operating on a "ping-pong" basis such that processor 530 writes halftone image data for the next image to be proofed into one of these disks, while it reads halftone image data for the current image being proofed from the other disk and applies that data to the proofing engine. The processor alternates the function of each of these disks between reading and writing as data for successive images to be proofed is applied to the DDCP system.

RIP 510 is connected to proofing engine 570 through serial message link 560 which carries status and error messages, commands and parameters between these units on a serial basis. Data interface 550, which is formed of sixteen-bit parallel (active high) image data bus 553 and image control bus 555, is used to transfer halftone image data in sixteen-bit parallel form (for transferring halftone data for sixteen successive pixels at a time) from the RIP to the proofing engine. The RIP pads, as necessary, each micro-raster of the image to a sixteen-bit word boundary and, prior to the transfer of data across data bus 553, notifies the proofing engine, via serial link 560, as to the number of halftone bytes existing on each line of the proof image. This number is a constant for each image. Image control bus 555 contains three separate lines (not specifically shown): data ready, data request and data acknowledge, which are collectively used by RIP 510 and proofing engine 570 to implement a simple interlocked handshake protocol to transfer each successive sixteen-bit data word between these components. In particular, to transfer a sixteen-bit data word, RIP 510 asserts a signal (active low) on the data ready line (the "data ready signal") to inform the proofing engine that data transfer is to begin. Thereafter, to obtain this data word, the proofing engine asserts a signal (active low) on the data request line (the "data request signal"). Once this assertion is detected by the RIP, the RIP places the sixteen-bit data word onto image data bus 553 and then asserts a signal (also active low) on the data acknowledge line (the "data acknowledge signal"). Once the proofing engine reads this data word, then, in response to the asserted data acknowledge signal, the engine de-asserts the data request signal. In response to this, the RIP de-asserts the data acknowledge signal thereby completing an interlocked handshake operation and the accompanying successful data transfer. On the rising edge of the data acknowledge signal, proofing engine 570 loads the incoming sixteen-bit data value into an internal holding first-in first-out (FIFO) circuit within a data interface module (see FIG. 8). These steps are then repeated in seriatim for each successive sixteen-bit data word that is to be transferred from RIP 510, shown in FIGS. 5A and 5B, to the proofing engine for the current proof image to be printed. After all the halftone data has been transferred for a given proof image, the RIP will de-assert the data ready line. For each proof that is to be printed, the RIP successively transfers to the proofing engine the complete bit-mapped halftone image data, as a succession of sixteen-bit words, for each separate halftone separation image that is to form the proof.

Operator PC 520, containing display and keyboard 521 and processor 522, is a conventional personal computer that is interfaced through serial links 533 and 537 to both RIP 510, specifically processor 530 therein, and proofing engine 570. This PC permits a DDCP operator to monitor and interrogate the status of as well as control both RIP 510 and proofing engine 570 and perform diagnostic and set-up operations thereon, as desired. Densitometer 524, under control of operator PC 520, is used to measure the density of various test patches generated by the proofing engine in order to calibrate its performance. Modem 525 provides a dial-up telephone link for use in remotely diagnosing any abnormalities that may occur within the DDCP system. Line printer 526 can be used by the DDCP operator to provide a local printout of desired information.

Proofing engine 570 is preferably a multi-laser sublimation dye transfer binary marking engine. In essence, to print a proof image by the marking engine, a receiver sheet (i.e. a film media with a transfer layer) of appropriate dimensions is automatically cut and wrapped onto a rotating drum (not shown) within the engine. Thereafter, to generate a particular C,Y,M or K separation, a respective C,Y,M or K dye donor sheet is first spooled off a supply reel within the engine and superimposed, in proper registration, onto the receiver sheet with an emulsion side of the donor sheet contacting the receiver sheet. Thereafter, a bit-mapped image for an appropriate halftone separation is written by the proofing engine onto the donor sheet by selectively exposing that sheet, using a writing laser, at each location where a darkened writing spot is to appear. At each such location, the exposure causes a controlled amount of dye to migrate (transfer) from the donor sheet to the top of the transfer layer of the receiver sheet. For each darkened writing spot, the intensity of the light produced by the writing laser determines the amount of dye that transfers to the receiver sheet. Once this occurs, the donor sheet is removed from the receiver sheet. This process is then repeated using a differently colored donor sheet for each remaining separation. This entire toning process is then successively repeated for the bit-mapped images that form the separations for each special color and specifically to form primary colored component halftone dots that, after having been accurately overlaid on a dot-on-dot basis, will paint all the regions in the proof image with the corresponding recipe color. In addition, the proofing engine can accommodate differently colored receiver sheets. Furthermore, the marking engine can also accommodate two specially colored donor sheets and write accompanying separations thereon for transfer to a receiver sheet. These colored donor sheets and accompanying separations can be used to generate an exact shade of either of two special colors, such as "KODAK" yellow, or of special colors that are not within the color gamut defined by cyan, yellow, magenta and black, e.g. "Hot" pink, phosphorescent, pastels or gold colors. (KODAK is a registered trademark of the Eastman Kodak Company of Rochester, New York which is also the present assignee hereof.) For purposes of simplifying the ensuing discussion, we will assume that the proofing engine is writing only primary colored separation data. Once proofing engine 570 writes all the primary colored separations for a particular proof image, including those for the "non-special" and "recipe" colors, onto a receiver sheet, the engine ejects that sheet as intermediate sheet 575. At this point, the entire proof image is situated on the top of the transfer layer of the receiver sheet that forms the intermediate sheet. In order to transfer the proof image from the intermediate sheet to paper media, in order to form a so-called "proof sheet", the DDCP operator manually inserts intermediate sheet 575 along with a sheet of prelaminate material and a sheet of press stock into laminator 580. The laminator is not electrically connected to any of the components within DDCP system 500. Once the operator feeds these sheets into the laminator, it first prelaminates the press stock to the intermediate sheet and then laminates the transfer layer to the press stock. Once lamination is completed, a laminated page emerges from the laminator with the transfer layer containing the proof image fused to the press stock. The operator then peels off and discards intermediate layer 585, which is a backing layer, and then retains proof sheet 590 containing the proof image. For purposes of the present invention, any one of a number of different types of proofing engines could be used. Inasmuch as the laminator does not form part of the present invention, it will not be discussed in any further detail below.

In order to generate a proof image, an operator situated at any of CEPSs 503 formulates a proof request through a keyboard and interactive menu based screen displays provided thereat. The proof request, as defined below and shown in FIGS. 6A-6D, contains those parameter values and file name(s) that are necessary, when proofing resources are available, to set-up the DDCP system to generate a proof image. The parameter values define the manner through which the contone image data for the proof image is to be processed by the RIP, such as by defining screen rulings and angles, separation sequence, number of copies, recipe color(s) to use, and the like, and then printed by the proofing engine. The file name(s), which are defined by the CEPS operator, specify the names of the data file(s) that reside on the CEPS and contain the interleaved contone image data for that proof image. Note however, that the proof request does not however contain the image data itself but only an identification of the file(s) which stores that data. By eliminating image data from each proof request, the size of each proof request is substantially reduced from upwards of approximately 100 MBytes (for image containing both contone data and linework) to approximately 200 bytes.

After a proof request has been entered, the particular CEPS on which it is entered will transmit that request to DDCP system 500 and specifically to RIP 510. Proof requests can be entered either while the DDCP system is currently processing a prior proof request, printing a proof image or performing neither operation. RIP 510 maintains a proof request queue within one of the two hard disks, illustratively within hard disk 541. This queue contains three separate queues: a "rush" queue, a "normal" queue and a "hold" queue. Based upon the priority accorded to the request by the operator, i.e. rush, normal or hold, RIP 510 places the incoming request at the bottom of the appropriate queue. Those requests that have been assigned a rush priority are sequentially processed first, again on a first-in first-out basis, by the RIP and, in turn, forwarded to the proofing engine for printing ahead of any "normal" priority requests. A request with a "hold" priority is merely retained in the "hold" priority queue but is not processed until such time as its priority is changed or it is incorporated, by an operator, into a "scatter" proof request. A scatter proof is a proof that contains a number of non-overlapping images, here arising from separate proof requests, that are printed on a common proof sheet.

Through operator PC 520 and specifically through various interactive menu based screen displays generated thereat, the DDCP operator can edit the contents of each of the queues and each proof request therein. Because the image parameters that configure the proofing engine for any proof image form part of the request for that proof, the operator can change, as desired, the condition(s) under which any individual proof will be generated, e.g. by changing screen ruling, screen angle for any individual halftone separation and the particular recipe color(s), if any, that are to be used. In addition, the DDCP operator can also re-prioritize the proof requests, re-arrange the order in which the proof images are successively generated, and even add or delete proof requests from each queue. Furthermore, as discussed in conjunction with FIGS. 10 and 11 below, the DDCP operator can also list those recipe colors for which definitional (i.e. set-up) data is stored on raster image processor 510, create a file of data for a new recipe color or select such a file for an existing recipe color that is to be modified and subsequently modify the recipe color definition stored in that file.

The RIP begins processing a particular proof request once that request reaches the top of its associated queue. To simplify matters for purposes of the ensuing discussion, the proof request queue will be assumed, on a simplistic basis, as containing only one queue. Specifically, after the most recently occurring request has been fully processed, the RIP reads the next proof request situated at the top of the queue. Once this request has been read, the RIP determines, based upon the parameter values specified in that request and current system resources, whether a proof image for that request can be currently printed or not. In this regard, for example, if the request specifies a particular media color, the RIP determines through querying proofing engine 570 whether media for that color has been loaded into the engine and whether sufficient supplies of that media exist to generate the proof. Similarly, if a special color donor sheet is specified, the RIP inquires as to whether that donor sheet is available, and so forth for other consumable items.

If the RIP determines that appropriate system resources exist to generate a proof image for this request, then the RIP obtains the appropriate contone data file(s) from the CEPS that generated this request. The appropriate file name(s) and an identification (device number) of this CEPS are specified within the proof request. For example, for a proof request generated from CEPS $503_2$, RIP 510, as shown in FIGS. 5A and 5B, sends an instruction containing the file name(s) specified in that request for the accompanying contone data to this CEPS. In response, the CEPS reads the file(s) and supplies the data over line $505_2$ to RIP 510. This data will be routed through the appropriate interface circuitry, such as circuitry $512_2$, which provides an appropriate hardware interface for this CEPS to the RIP. The data is then routed, via CEPS bus 515, to processor 530 situated within RIP 510. The processor will first translate this data, if necessary through an appropriate translation routine, into a form compatible with RIP programming. This may include, for example, inverting density values where on a particular CEPS a "0" eight-bit contone value may indicate full density, while on the DDCP the same value would indicate no density. To provide compatibility across many different CEPSs, separate hardware interfaces and software translation routines, to the extent needed, will exist within the RIP for each different CEPS. As such, the DDCP can function with a wide variety of different CEPSs, and nearly any number of different CEPSs can be interfaced to CEPS bus 515. After the contone data has been appropriately translated, RIP 510 will electronically screen the data for each separation to generate a halftone separation for each different primary color. To generate each recipe color, this processing also includes transforming the contone separation values through the appropriate dot gain look-up table, as discussed above, in order to obtain the proper dot size for each component halftone dot that will be printed on a dot-on-dot basis to generate that recipe color. Thereafter, the RIP stores all the data for the halftone separations for the current image being processed, including that for the separations for each of the desired recipe color(s), in either hard disk 541 or 543. At the same time, the RIP is reading halftone image data for the image that has most recently been processed and is applying that data over data interface 550 to proofing engine 570 to generate a proof image therefor. To increase throughput, the RIP pipelines the image processing and printing functions. Specifically, while processed halftone image data is being read from one hard disk and printed, newly processed image data for the next image to be printed is being stored on the other hard disk. Under the control of RIP 510, each of the hard disks reverses its function with each successive image. Operating the hard disks in this fashion increases the throughput of proof images through the DDCP and allows the system to produce a relatively steady stream of images through the system at or near that of the proofing engine. Therefore, assuming that the RIP is currently reading halftone image data from hard disk 543 for printing, newly processed image data for the current image being processed will be stored on hard disk 541. Once all the data has been supplied from hard disk 543 to proofing engine 570 in order to print the most recently processed image, then, shortly thereafter, RIP 510 will read the halftone image data stored on hard disk 541 and supply it to the proofing engine for printing, with this process being repeated for successive images to be proofed. Inasmuch as the particular image processing, apart from dot gain transformation that occurs to the contone image data by RIP 510, does not form part of the present invention, this processing will not be discussed in any further detail below. For a detailed explanation of the queue based manner in which proof requests are processed through RIP 510, including the use of hard disks operating on a "ping-pong" basis, the reader is referred to the co-pending United States patent application entitled "A Queue Based Technique for Handling Proof Requests in a Direct Digital Color Proofing System" from applicants S. Auer et al, Ser. No. 07/749,024; filed Aug. 23, 1991 and which has been assigned to the present assignee hereof and which is incorporated by reference herein.

The proof requests that reach the top of either of the "rush" or "normal" priority queue but can not be processed by the RIP at the time they were read retain their place in their respective queue pending subsequent processing. Proof requests can also be entered by the DDCP operator through operator PC 520 and specifically using menu driven interactive screen displays and keyboard entry through display and keyboard 521.

FIG. 6A depicts the data structure of a typical proof request. This request is stored within the proof request queue as proof request (queue element) 600. Request 600 contains a succession of fields, with their accompanying reference numbers, listed and described below in Table 1.

TABLE 1

| Proof Request Fields | |
|---|---|
| Item | Description |
| Pointer to next entry (605) | Pointer to next entry (proof request queue element -- PRQE) in a linked list, that forms a queue, (rush, normal or hold) which holds this proof request; |
| Image file description (610) | Data structure which specifies: characteristics of the particular contone data to use in generating a proof image; file, device and page names for this data; and various image processing flags to enable/disable corresponding imaging features; |
| Output color order (625) | String defining the order of cyan, magenta, yellow, black, one media "special" color and/or two additional "special" separation colors for use in up to five successive halftoning passes for a common proof image; |
| Screen ruling (630) | Floating point value between 65-200 lines/inch continuous (approximately 25.59-78.74 lines/cm) which specifies the screen ruling to use for all the separations; |
| Dot font (635) | Byte specifying dot font, e.g. diamond, elliptical, square, round, gravure or composed; |
| Description (640) | Optional text for a data legend to be printed on the side of the proof image; (string); |
| Number of copies (645) | Integer value from 1-50 designating number of copies of a proof image to print (byte); |
| Upper left hand corner x coordinate position (650) | Integer value (in mm) defining the x position of the upper left hand corner of an image to be proofed relative to the media sheet -- only required for use in a scatter proof request; |
| Upper left hand corner y coordinate position (655) | Integer value (in mm) defining the y position of the upper left hand corner of an image to be proofed relative to the media sheet -- only required for use in a scatter proof request; |
| Scatter proof enable (660) | Boolean value specifying whether this proof request can be part of a scatter proof request. If this enable is not set, then the associated request will not be included in a scatter proof request regardless of whether the associated request has been given a "hold" priority; |
| Priority | Byte specifying rush, normal or |

TABLE 1-continued

| Proof Request Fields | |
|---|---|
| Item | Description |
| (665) | hold; |
| Extra Separation Names (670) | Strings (up to two) which specify the file names of up to two extra (additional) separations that are to be generated for the proof image; |
| Recipe Color Number (675) | Strings (up to two) which specify the number of up to two recipe colors to be used in printing a proof image; and |
| Pass parameters (680) | Data structure specifying parameter values particular to each halftone printing (writing) pass that is to be undertaken by the proofing engine. |

As indicated in FIG. 6B, image file description field 610 is itself a data structure that, among other things, contains a succession of names and parameter values pertinent to the particular contone data to use in generating a proof image for this request. Specifically, the constituent fields in field 610 are listed, with their accompanying reference numbers, and described below in Table 2.

TABLE 2

| Image File Description Fields | |
|---|---|
| Item | Description |
| CEPS Device Name (611) | String that specifies the name of the CEPS (or other device) on which the contone data file(s) reside; |
| Job Name (612) | String that defines a job name for the current proof request. Fields 611 and 612 are automatically established for this proof request once the CEPS (or DDCP) operator establishes a pathname at the CEPS (or the operator PC) for the contone file(s); |
| Page Name (613) | String which identifies the name of the particular page in the artwork to be proofed through this request; |
| Image Name (614) | String which identifies the name of the particular image in an artwork to be proofed through this request; |
| CT resolution (615) | Integer value that specifies the resolution of the contone image file(s) to be proofed through this request; |
| LW resolution (616) | Integer value that specifies the resolution of the accompanying linework file(s) to be proofed through this request; |
| Image Height (617) | Integer value (in mm) that specifies image height; |
| Image Width (618) | Integer value (in mm) that specifies image width; and |
| Image Feature Flags (619) | Byte containing various boolean flags to control various image processing and printing functions. |

Image feature flags 619, as specifically shown in FIG. 6C, contain separate boolean fields for the functions of, inter alia: image scaling, rotation, mirror orientation, control strip enable and data legend enable. Specifically, the scaling ("Scale to Fit") flag, if set, permits the RIP to scale the size of the image, if needed, to fit the dimensions of a proof image area that has been defined on the media on which the proof will be generated. Similarly, the rotation ("Rotate Image") flag, if set, permits the RIP to rotate the image by 90°, if needed, to fit the proof image area. The mirror ("Mirror Image") flag instructs the proofing engine, through the RIP, to change the orientation of the image, in a fast scan direction, based on whether the contone data was stored in a so-called "mirrored" format by a CEPS which generated this request. The control strip enable flag, if set, instructs the RIP to print a control strip on the edge of the proofed image as it is being printed. The control strip consists of a series of single color test patches for use in subsequent densitometric measurements of the proofing process. Lastly, the data legend enable flag, if set, instructs the RIP to print a data legend, as specified in description field 640 shown in FIG. 6A, on the edge of the proofed image as it is being printed.

As indicated in FIG. 6D, pass parameters field 680 is itself a data structure that is replicated up to five times and contains parameter values pertinent for each successive halftoning pass that is to be performed by the proofing engine to generate a proof image for the associated request. Inasmuch as four separate passes can occur for the four different primary colored donor sheet colors and a separate pass can occur for a special colored media sheet, five separate halftoning passes to generate the "non-special" colors can be specified in a proof request. Similarly, this toning process can be repeated to separately tone each of the desired primary colors on a proof image so as to produce composite dots, such as illustratively dot 100 shown in FIG. 1, that will depict each recipe color. Although the proofing engine can accommodate a different specially colored media as well as a normal media, only one such media can be used to generate any one proof image. The order of these passes, for the 3 ∂non-special" colors, is that specified in output color order field 625 shown in FIG. 6A. Therefore, the first occurrence of field 680 is for the first halftoning pass specified in output order field 625, the second occurrence of field 680 is for the next successive halftoning pass and so on for each of the remaining passes. Specifically, the constituent fields that form each one of pass parameter fields 680 are listed, with their accompanying reference numbers, and described below in Table 3.

TABLE 3

| Pass Parameters Fields | |
|---|---|
| Item | Description |
| Screen angle (681) | Floating point value between ±180° continuous specifying the screen angle for a corresponding pass; |
| Dot gain table (683) | String which identifies a dot gain table to use in this pass; and |
| Solid area density (685) | A signed byte between the values ±22 for a halftoning pass for a donor sheet color, or between ±99 for halftoning pass for a special media color. |

As discussed above, for any image being proofed, a separate set of C,Y,M and/or K separations of that image but only for a given special color, is used to print each corresponding recipe color. For these particular separations, the specific dot gain table and solid area density information that would ordinarily occupy pass parameters field 680 is instead read from a corresponding recipe special color definition file, which is discussed in detail below in conjunction with FIG. 11. This file specifies the lay-down order of the primary colored component halftone dots as well as the corresponding solid area density correction values therefor.

Figure 7:
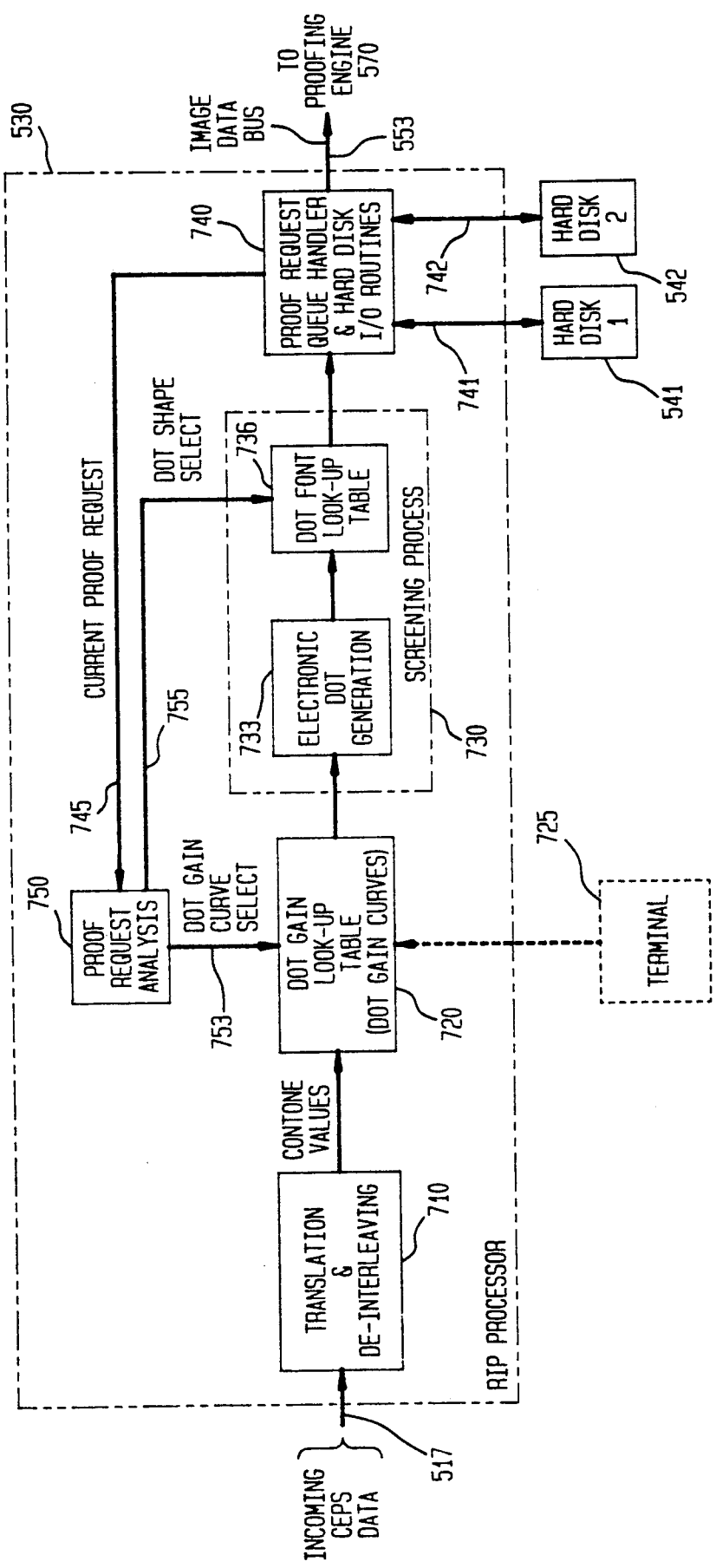
FIG. 7 depicts a simplified high level block diagram of a process through which contone separation data is processed within processor 530 shown in FIGS. 5A and 5B to yield halftone image data for proofing engine 570 and specifically including the processing occurring within processor 530 for use in generating a recipe color in accordance with our invention.

FIG. 7 depicts a simplified high level block diagram of the process through which contone separation data is processed within processor 530 shown in FIGS. 5A and 5B to yield halftone image data for proofing engine 570 and specifically including the dot gain processing that occurs within RIP processor 530 for use in generating recipe colors in accordance with our invention. To simplify the following discussion, only the contone separation data for those separations used in generating a recipe color will be specifically discussed.

To facilitate the explanation of FIG. 7, assume for the moment that a proof request has reached the top of either the "rush" or "normal" queue and is now being processed to produce bit-mapped composite halftone dots for the first recipe color listed therein. As such, proof request queue handler and hard disk input/output (I/O) routines 740 will have sent, through lines not shown, an instruction to a particular CEPS specified in this request to obtain corresponding interleaved separation data therefor. In response to this instruction and through an appropriate interface (any one of interfaces 512 shown in FIGS. 5A and 5B), the interleaved CEPS data appears on line 517 shown in FIG. 7. Within RIP processor 530, this data is first translated and de-interleaved into different contone separation files by translation and de-interleaving process 710. In addition, the current proof request will have been applied, as symbolized by line 745, to proof request analysis process 750. This process, inter alia, accesses the accompanying definitional file for the recipe color delineated in that request. Based upon the order of the separations specified in this file for this recipe color and the names of the specific dot gain functions to be used therefor, process 750 selects, as symbolized by line 753, the particular dot gain look-up table from those residing within tables 720 for use in processing the incoming contone values provided by process 710 for each incoming separation for this first recipe color. Accordingly, each contone value in that separation file is then applied as input to this particular look-up table within tables 720 in order to impart the necessary amount of dot gain (either an increase or a decrease) to that value. Prior to processing the contone values for an incoming proof request, RIP processor 530 loads into tables 720 all the values for all the dot gain functions that are to be used in generating all the recipe colors listed in that request. Each resulting contone value produced by tables 720 is then applied to screening process 730 which converts the contone value into an appropriate bit-mapped component halftone dot therefor. Process 730 can be simplistically viewed as containing electronic dot generation process 733, which generates appropriate bit-mapped values, followed by dot font look-up table 736 which, based upon these values, supplies a particularly sized halftone dot pattern in a selected dot font. The particular font to use (e.g. diamond, elliptical, square, round, gravure or composed) is selected by proof request analysis process 750 based upon the value of the byte contained within "Dot Font" field 635 (see FIG. 6A) contained in the current proof request. The resulting halftone bit-mapped image data is then applied, as shown in FIG. 7, to proof request queue handler and hard disk I/O routines 740 for storage on that one of two hard disks 541 or 543 which is currently writing information for the current proof request. As noted above, the other hard disk is reading bit-mapped image data through process 740 for application, via image data bus 553, to proofing engine 570 for printing. This same processing is repeated in seriatim to generate an appropriate bit-mapped component halftone dot pattern for each of the other separation files for the first recipe color and is then successively repeated using the contone separation files, along with different corresponding dot gain look-up tables, to yield all the bit-mapped component halftone dot patterns for the second recipe color (assuming one is listed) in the current proof request.

Optional terminal 725, which is shown in dashed lines, can be connected directly to the RIP processor and used by an operator to create or delete any of the dot gain functions stored within tables 720 or modify any of the specific values therefor. As noted above, these same functions can also be accommodated through operator PC 520 (see FIGS. 5A and 5B).

Figure 8:
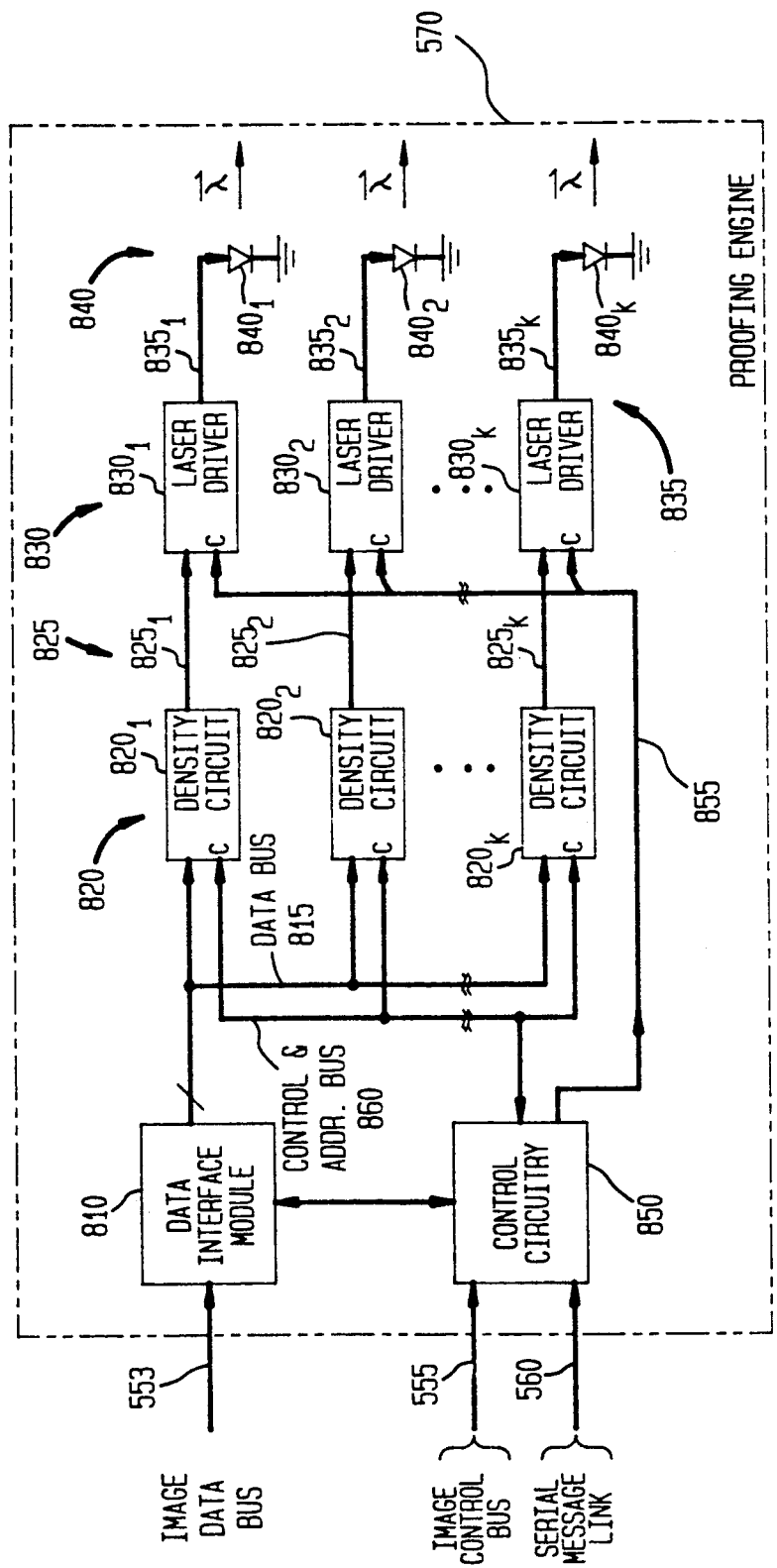
FIG. 8 depicts a block diagram of those components of proofing engine 570 that are germane to our present invention.

FIG. 8 depicts a block diagram of those components of proofing engine 570 that are germane to our present invention and specifically which provide solid area density correction in accordance with the teachings of our invention.

As shown, proofing engine 570 contains data interface module 810; density circuits $820_1, 820_2, \ldots, 820_k$ collectively forming density circuits 820; laser drivers $830_1, 830_2, \ldots, 830_k$ collectively forming laser drivers 830; laser diodes $840_1, 840_2, \ldots, 840_k$ collectively forming laser diodes 840; and control circuitry 850. Bit-mapped image data appearing on image data bus 553 is routed, via data interface module 810, to density circuits 820. The output of data interface module 810 is applied through data bus 815 to density circuits $820_1, 820_2, \ldots, 820_k$ which, in turn, route their corresponding outputs, via lines $825_1, 825_2, \ldots, 825_k$, to laser drivers $830_1, 830_2, \ldots, 830_k$. These drivers each contain appropriate analog-to-digital converters and associated drive circuitry to convert the digital exposure levels applied thereto and appropriately energize lasers $840_1, 840_2, \ldots, 840_k$, via leads $835_1, 835_2, \ldots, 835_k$, to properly expose a corresponding separation pattern on each sublimation dye transfer donor sheet for a proof image.

The data appearing on image data bus 553 can either be sixteen successive halftone bits or two successive eight bit contone values. In the case of halftone data, the sixteen halftone bits, for any one separation, represent the state of sixteen successive pixels (writing spots) that are situated along a micro-raster for that separation in the proof image. Each density circuit operates on and writes a particular pattern, be it halftone or contone, for an eight-bit byte of the incoming sixteen bit data. As such, data interface module 810 appropriately de-multiplexes each sixteen-bit data word appearing on image data bus 553 into two eight-bit bytes. The high order eight-bit byte is applied to one density circuit, such as circuit $820_1$; while the low order byte is applied to the next density circuit, such as circuit $820_2$. Successive sixteen-bit data words are de-multiplexed and applied by the data interface module to successive corresponding pairs of density circuits in a round-robin fashion. In response to each incoming eight-bit value applied to a density circuit, that circuit appropriately sets the exposure of its associated laser diode. The laser diode will then write an appropriate halftone or contone pattern on the proof. If the incoming data to a density circuit is eight-bit halftone data, then that density circuit successively generates, through its associated laser diode, eight successive and corresponding writing spots at appropriate exposure levels to represent the "on" and "off" states thereof. Exposure levels are set to a twelve bit resolution with each halftone bit specifying either one of two of these levels. The density circuit uses a density look-up table, as discussed above and specifically shown in FIG. 9, to appropriately set each of these levels to yield the proper solid area density therefor. Alternatively, if an eight-bit contone value is to be written, then the density circuit sets the proper twelve bit exposure level of the associated laser diode to one of 256 values and then appropriately energizes the laser to write this value. Here too, the density circuit uses the look-up density table, with appropriate stored values, to transform the exposure level for the eight-bit contone value to yield the proper solid area density on the proof image for this contone value.

Control circuitry 850, which is connected to both image control bus 555 and serial message link 560, regulates, among other things, the amount of data that is transferred over image data bus 553 to interface module 810 based on marking speed of the proofing engine and controls the operation of each of the density circuits and each of the laser drivers.

Figure 9:
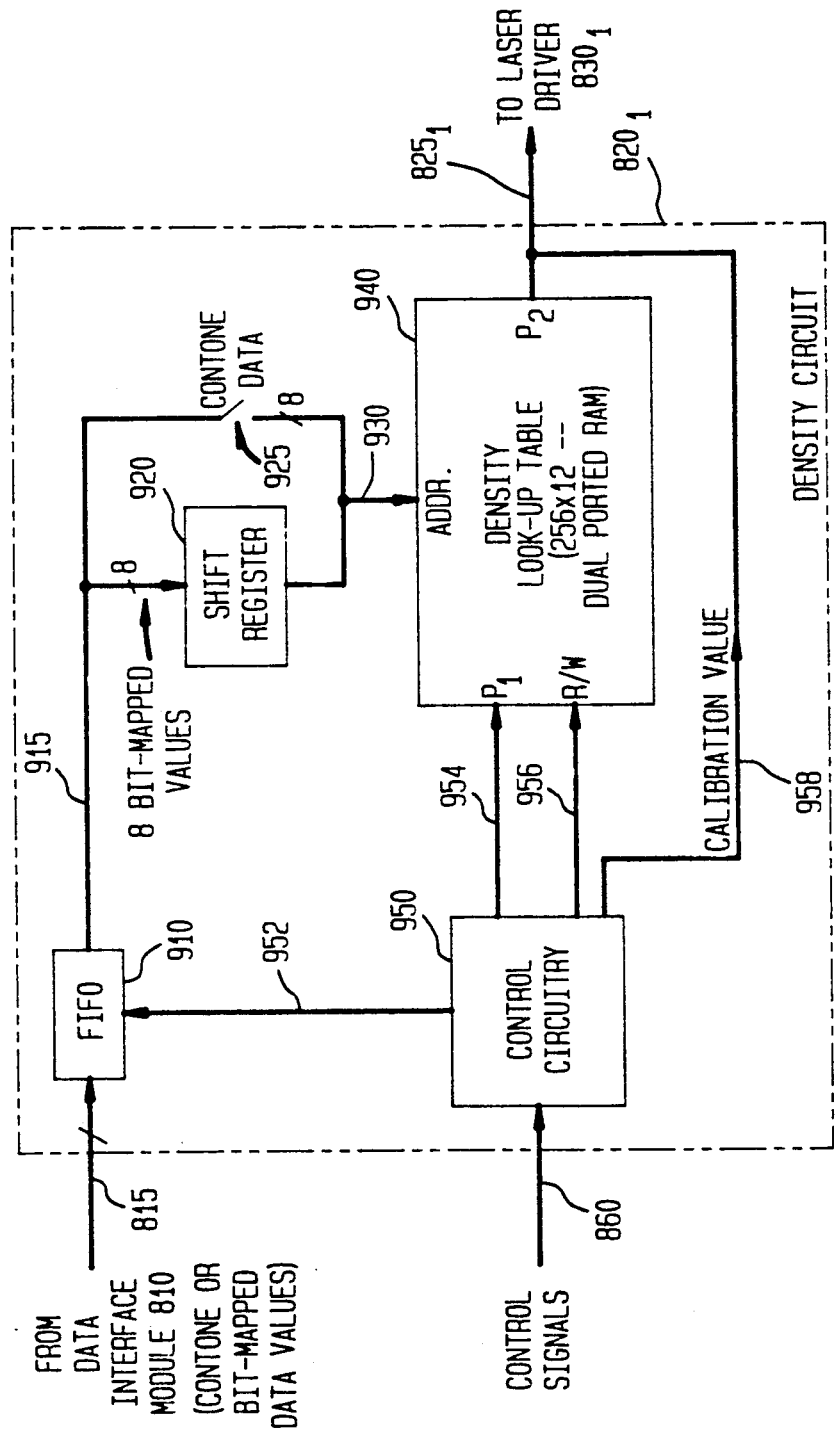
FIG. 9 depicts a block diagram of illustrative density circuit 8201 situated within proofing engine 570 shown in FIG. 8 and which specifically includes solid area halftone density conversion look-up table 940 for use in generating a recipe color in accordance with our inventive teachings.

FIG. 9 depicts a block diagram of illustrative density circuit $820_1$ situated within proofing engine 570 shown in FIG. 8 and which specifically includes solid area halftone density conversion look-up table 940 for generating recipe colors in accordance with our inventive teachings.

As shown, density circuit $820_1$ contains FIFO 910, shift register 920, switch 925, density look-up table 940 and control circuitry 950. Each incoming eight-bit byte applied from the data interface module and appearing over leads 815 is routed to FIFO 910. This FIFO is implemented using a random access memory (RAM) buffer and latches the incoming value. If the incoming byte represents an eight-bit contone value, then this byte is applied, via switch 925, directly to the address input of look-up table 940. This eight-bit value accesses a stored twelve-bit value from the look-up table, which, in turn, is applied as the appropriate exposure level, via leads $825_1$, to laser driver $830_1$. This look-up table has been previously loaded, as described above, with proper solid area density values to properly adjust the solid area density for each contone value.

Alternatively, if the incoming eight-bit byte appearing on leads 815 represents halftone data, then switch 925 is opened with the value of this byte being loaded in parallel into shift register 920. Thereafter, this shift register is operated to successively shift its contents one bit to the right and apply the value of the least significant bit in the register, via leads 930, as a one-bit address input to density look-up table 940. In the event this one-bit value is zero, then this indicates an even address input value with table 940 generating a pre-defined twelve-bit exposure value that is associated with the "off" state for a corresponding writing spot. Alternatively, if this one-bit value is one. Then this indicates an odd address input with table 940 generating a pre-defined twelve-bit exposure value that is associated with the "on" state for a corresponding writing spot. Hence, in response to each eight-bit halftone data byte applied to density circuit $820_1$, this circuit will produce the desired exposure level of the corresponding "on" or "off" state for each of eight successive writing spots. Control circuitry 950, which is connected, via lead 860, to control circuitry 850 (see FIG. 8) in the proofing engine and, via leads 952, 954 and 956, as shown in FIG. 9, to FIFO 910 and density look-up table 940 provides overall control of density circuit $820_1$ and individual control of all the components situated therein. In addition, the control circuitry also generates, as needed, a pre-defined twelve-bit exposure level on leads 958 for use in calibrating the laser diode connected to laser driver $830_1$. In addition, look-up table 940 is preferably implemented using a dual ported RAM which is loaded with pre-defined twelve-bit values, via port $P_1$, through control circuitry 950 and which supplies output values through port $P_2$.

FIG. 10 depicts recipe colors selection screen display 1000, that is generated at operator PC 520 situated within DDCP system 500 shown in FIGS. 5A and 5B. Through this screen display, the DDCP operator can list those recipe colors for which definitional (i.e. set-up) data is stored on raster image processor 510, create a file of data for a new recipe color and/or select such a file for an existing recipe color that is to be modified. The DDCP operator accesses this screen through an interactive screen displayed menu driven user interface provided through operator PC 520 (see FIGS. 5A and 5B). Inasmuch as the specific software for generating screen displays 1000 and 1100 (the latter being shown in FIG. 11) and the interaction of this software with processor 530 within RIP 510 (see FIGS. 5A and 5B) to implement the functions specified through these displays would all be readily apparent to those skilled in the art, the software will not be discussed in any detail.

Once screen display 1000 appears on display and keyboard 521 (see FIGS. 5A and 5B) this display, as in FIG. 10, presents a list to the operator of all the available recipe colors that have been previously defined, i.e. "set-up", and are currently stored within RIP 510. Through this list, the operator can select any recipe color to edit. Creation of a new recipe color entails copying the definition for an existing recipe color, then editing its contents as needed and finally saving the edited definition with a new recipe color name. Various user functions that can be used with this screen display are implemented using program defined "soft" function keys. Specifically, the "Enter" function provides the function of actually entering operator responses into the screen. The "Delete" function, when invoked, prompts the operator for a name and number of a recipe color to be deleted and, once this information has been entered, thereafter prompts the operator to verify a delete operation. Once verification is provided, the "Delete" function merely deletes the definition for the chosen recipe color from the DDCP system. The "Rename" function permits an operator to rename any selected recipe color in the displayed list under a different name. The "Copy" function, when invoked, creates a duplicate of a selected recipe color definition under a new name supplied by the DDCP operator. Lastly, through the "Prev" and "Next" functions, the DDCP operator can scroll between and display previous and next successive screens of listed recipe colors, where the number of such colors exceeds those which can be displayed on a single display screen.

Once a recipe color has been selected or an existing definition has been copied as a definition for a new recipe color, then operator PC 520 will cause Recipe Colors Setup Screen Display 1100 to appear for that particular recipe color on display and keyboard 521 shown in FIG. 5. Through this screen, the DDCP operator can appropriately edit the parameters that define this recipe color.

Specifically, as shown in FIG. 11, the definitional, i.e. "set-up", information for a recipe color includes the screen ruling, the specific primary process colors (C,Y,M and/or K) to use, the lay-down order of these colors, the solid area density (in relative terms) for each of these primary colors and the specific dot gain table (function) to use for each of these colors. For example, for the recipe color named "Pink 45" (abbreviated as "Pnk45") shown in FIG. 11, this color is produced through a recipe calling for a recommended screen ruling of 4.8 with cyan, yellow, magenta and black component halftone dots being laid down in that order with corresponding solid area densities of $+3$, $-1$, 0 and $+12$ and pre-defined dot gain tables having the names "Number 9", "Number 6", "MagDotG", and "StdBP", respectively, to appropriately size the component halftone dots. The recommended screen ruling is provided for informational purposes and can be filled in by the individual who establishes the definition for the recipe color. In fact, separate definitions can be established and saved under appropriate names, within the DDCP system, for the same recipe color but with different screen rulings, if desired. Through the "Save" function, the DDCP operator can save a recipe color definition under its current filename. Through the "Select" function, the operator can select the component primary color that is to be edited or moved up or down the list so as to change the lay-down order. The "Move" function permits the DDCP operator to move a component primary color to a different position in the displayed lay-down order. The "Edit" function, when invoked, permits the DDCP operator to change any parameter value for a selected primary color. Lastly, the "Quit" function causes the operator PC to exit the procedure that generated screen display 1100 and move to a higher level display screen.

Although, for purposes of flexibility and simplification, separate dot gain and density tables are used for each different primary color that is to be used in conjunction with each recipe color, these tables could be combined, in some fashion, for each such color, if desired. Furthermore, although separate look-up tables are also used to store each different dot gain function for each different primary color to generate each recipe color, these tables could also be combined in a common memory with appropriate addressing used to select the appropriate entries.

In addition, although we have discussed our invention in terms of using accurate dot-on-dot placement of component halftone dots of varying size and solid area density to yield a composite dot, these component halftone dots could also be skewed (i.e. not concentrically aligned) with respect to each other, by pre-defined positional offsets, to yield a corresponding composite dot. Use of such a variable offset will provide an additional degree of freedom that, when integrated by the human eye in conjunction with changing dot size and solid area density, may further expand the range of available recipe colors that could be produced by merely changing the dot size and solid area density of primary colored component halftone dots. Inasmuch as the varying positional offsets may give rise to objectionable Moire or other visually apparent periodic patterns in the proof, a small amount of random or pseudo-random noise may need to be injected into the positional addresses of each of these offsets, and for each component dot, to eliminate these patterns. Further along these lines, pre-defined look-up tables of positional offsets could also be included to appropriately locate the placement of each component dot in a composite dot given the desired recipe color to be obtained thereby. In this instance, a specific offset table could be used for each specific recipe color that is desired. Alternatively, such a table could merely specify the range of recipe colors that could be achieved through positional offsetting of each individual component dot with interpolation being used to calculate the appropriate positional offset value of each such dot needed to yield an intermediate recipe color.

Although one embodiment of the present invention has been shown and described in detail herein, many other embodiments that incorporate the teachings of our invention may be easily constructed by those skilled in the art.

INDUSTRIAL APPLICABILITY AND ADVANTAGES

The present invention is useful in direct digital color proofing (DDCP) systems and particularly in such a system for modelling a desired color(s) that can be obtained through use of a multi-color, e.g. five or six color, printing press but is not reproducible within a color gamut associated with a primary colored, e.g. C,Y,M,K, halftone proof image. Through use of this invention, a color proof image can be fabricated to depict a much wider range of colors which will simulate a color halftone image that will be produced by such a multi-color press than has been heretofore achievable in the art.

We claim:

1. A method of generating a desired color in an output image from a plurality of different colorants, said output image being a halftone depiction of a contone input image, the method comprising the steps of:

obtaining data representing a plurality of color contone separations of said input image, each of said separations having incoming contone values wherein corresponding ones of said incoming contone values for all of said separations collectively define a region in the output image that is to contain the desired color;

generating a halftone dot for each one of the incoming contone values in each of said separations having a selected size and solid area density wherein the size and solid area density of said halftone dot is related to said each one of the incoming contone values so as to form a plurality of component halftone dots;

printing spatially corresponding component halftone dots from each of said separations each with a corresponding one of said colorants in superposition in a selected order and in registration so as to form composite halftone dots which collectively depict said desired color 2. The method in claim 1 wherein said generating step comprises the steps of:

modifying the incoming contone values contained in each one of the separations in accordance with a dot gain relationship in order to yield corresponding modified contone values, wherein said modified contone values contain a dot gain with respect to corresponding ones of said incoming contone values; and converting each of said modified contone values for each one of said separations into a halftone dot having a solid area density value so as to form said component dots for said one separation, wherein said solid area density value is a function of a separation color associated therewith.

3. The method in claim 2 wherein the printing step comprises the step of overlaying a spatially corresponding one of said component halftone dots from at least two of said separations to form a corresponding composite halftone dot.

4. The method in claim 3 wherein each of said colorants is a different primary color.

5. The method in claim 4 wherein said different colorants are cyan, magenta and yellow and black colorants.

6. The method in claim 2 wherein said incoming contone values modifying step comprises the step of applying each of said incoming contone values for said one separation through a first look-up table in order to produce corresponding ones of said modified contone values, said look-up table containing stored values that collectively define a dot gain function for the separation color associated with said one separation.

7. The method in claim 6 wherein said first look-up table comprises a plurality of separate dot gain look-up tables, wherein each one of the plurality of dot gain look-up tables stores a dot gain function for a different separation color; and wherein said incoming contone values applying step comprises the step of routing each one of the incoming contone values for said one separation through the dot gain look-up table associated therewith.

8. The method in claim 7 wherein said applying step further comprises the step of reading values from a memory into each of said dot gain look-up tables to form said first look-up table prior to modifying any of said incoming contone values.

9. The method in claim 2 wherein said modified contone values converting step comprises the step of varying intensity levels of a writer used to print each of said component halftone dots associated with said one separation in accordance with a solid area density relationship, wherein the solid area density relationship characterizes an exposure level for each writing spot that is to form said component halftone dot based on the separation color associated therewith and whether or not said each writing spot is to be darkened.

10. The method in claim 9 wherein said varying step comprises the step of: applying each bit-mapped value for each of said component halftone dots through a second look-up table in order to produce corresponding ones of the intensity levels, said second look-up table containing stored values for the solid area density relationship for the separation color associated with said one separation.

11. The method in claim 10 wherein said second look-up table comprises a plurality of separate solid area density look-up tables wherein each of the plurality of solid area density look-up tables stores a solid area density relationship for a different separation color; and wherein the bit-mapped values applying step comprises the step of: routing each one of the bit-mapped values for said one separation through the solid density look-up table associated therewith.

12. A method for generating a desired color in a halftone proof image from a plurality of different colorants in a direct digital color proofing system for generating the color halftone proof image from in-coming digitized prepress contone data for an input image, said system having means for processing the incoming prepress contone data to yield screened color halftone separation data representing halftone separations that are to collectively form the proof image, and a marking engine for writing each of said halftone separations with proper registration so as to form said proof image, comprising the steps of:

in said processing means:
obtaining data representing a plurality of color contone separations of said input image, each of said separations having incoming contone values wherein corresponding ones of said incoming contone values for all of said separations collectively define a region in the output image that is to contain the desired color; and generating a halftone dot for each one of the incoming contone values in each of said separations having a selected size and solid area density wherein the size and solid area density of said halftone dot is related to said each one of the incoming contone values so as to form a plurality of component halftone dots; and in said marking engine:
printing spatially corresponding component halftone dots from each of said separations each with a corresponding one of said colorants in superposition in a selected order and in registration so as to form composite halftone dots which collectively depict said desired color.

13. The method in claim 12 wherein said generating step comprises the steps of:

modifying the incoming contone values contained in each one of the separations in accordance with a dot gain relationship in order to yield corresponding modified contone values, wherein said modified contone values contain a dot gain with respect to corresponding ones of said incoming contone values, and converting each of said modified contone values for each one of said separations into a halftone dot having a solid area density value so as to form said component dots for said one separation, wherein said solid area density value is a function of a separation color associated therewith.

14. The method in claim 13 wherein the printing step comprises the step of overlaying a spatially corresponding one of said component halftone dots from at least two of said separations to form a corresponding composite halftone dot.

15. The method in claim 14 wherein said incoming contone values modifying step comprises the step of applying each of said incoming contone values for said one separation through a first look-up table in order to produce corresponding ones of said modified contone values, said look-up table containing stored values that collectively define a dot gain function for the separation color associated with said one separation.

16. The method in claim 15 wherein said first look-up table comprises a plurality of separate dot gain look-up tables, wherein each one of the plurality of dot gain look-up tables stores a dot gain function for a different separation color; and wherein said incoming contone values applying step comprises the step of routing each one of the incoming contone values for said one separation through the dot gain look-up table associated therewith.

17. The method in claim 16 wherein said applying step further comprises the step of reading values from a memory into each of said dot gain look-up tables to form said first look-up table prior to modifying any of said incoming contone values.

18. The method in claim 13 wherein said modified contone values converting step comprises the step of varying intensity levels of a writer used to print each of said component halftone dots associated with said one separation in accordance with a solid area density relationship, wherein the solid are density relationship characterizes an exposure level for each writing spot that is to form said component halftone dot based on the separation color associated therewith and whether or not said each writing spot is to be darkened.

19. The method in claim 18 wherein said varying step comprises the step of applying each bit-mapped value for each of said component halftone dots through a second look-up table in order to produce corresponding ones of the intensity levels, said second look-up table containing stored values for the solid area density relationship for the separation color associated with said one separation.

20. The method in claim 19 wherein said second look-up table comprises a plurality of separate solid area density look-up tables wherein each of the plurality of solid area density look-up tables stores a solid area density relationship for a different separation color; and wherein the bit-mapped values applying step comprises the step of routing each one of the bit-mapped values for said one separation through the solid area density look-up table associated therewith.

21. Apparatus for generating a desired color in an output image from a plurality of different colorants, said output image being a halftone depiction of a contone input image, the apparatus comprising:
  means for obtaining data representing a plurality of color contone separations of said input image, each of said separations having incoming contone values wherein corresponding ones of said incoming contone values for all of said separations collectively define a region in the output image that is to contain the desired color;
  means for generating a halftone dot for each one of the incoming contone values in each of said separations having a selected size and solid area density wherein the size and solid area density of said halftone dot is related to said each one of the incoming contone values so as to form a plurality of component halftone dots;
  means for printing spatially corresponding component halftone dots from each of said separations each with a corresponding one of said colorants in superposition in a selected order and in registration so as to form composite halftone dots which collectively depict said desired color.

22. The apparatus in claim 21 wherein said generating means comprises:
  means for modifying the incoming contone values contained in each one of the separations in accordance with a dot gain relationship in order to yield corresponding modified contone values, wherein said modified contone values contain a predetermined variation in dot gain with respect to corresponding ones of said incoming contone values; and
  means for converting each of said modified contone values for each one of said separations into a halftone dot having a solid area density value so as to form said component dots for said one separation, wherein said solid area density value is a function of a separation color associated therewith.

23. The apparatus in claim 22 wherein the printing means overlays a spatially corresponding one of said component halftone dots from at least two of said separations to form a corresponding composite halftone.

24. The apparatus in claim 23 wherein each of said colorants is a different primary color.

25. The apparatus in claim 24 wherein said different colorants are cyan, magenta and yellow and black colorants.

26. The apparatus in claim 22 wherein said incoming contone values modifying means comprises:
  a first look-up table containing stored values that collectively define a dot gain function for the separation color associated with said one separation; and
  means for applying each of said incoming contone values for said one separation through the first look-up table in order to produce corresponding ones of said modified contone values.

27. The apparatus in claim 26 wherein said first look-up table comprises a plurality of separate dot gain look-up tables, wherein each one of the plurality of dot gain look-up tables stores a dot gain function for a different separation color; and wherein said incoming contone values applying means comprises means for routing each one of the incoming contone values for said one separation through the dot gain look-up table associated therewith.

28. The apparatus in claim 22 wherein said modified contone values converting means comprises means for varying intensity levels of a writer used to print each of said component halftone dots associated with said one separation in accordance with a solid area density relationship, wherein the solid area density relationship characterizes an exposure level for each writing spot that is to form said component halftone dot based on the separation color associated therewith and whether or not said each writing spot is to be darkened.

29. The apparatus in claim 28 wherein said varying means comprises:
  a second look-up table containing stored values for the solid area density relationship for the separation color associated with said one separation; and
  means for applying each bit-mapped value for each of said component halftone dots through the second look-up table in order to produce corresponding ones of the intensity levels.

30. The apparatus in claim 29 wherein said second look-up table comprises a plurality of separate solid area density look-up tables wherein each of the plurality of solid area density look-up tables stores a solid area density relationship for a different separation color; and wherein the bit-mapped values applying means comprises means for routing each one of the bit-mapped values for said one separation through the solid area density look-up table associated therewith.

31. A direct digital color proofing system for generating a color halftone proof image from incoming digitized prepress contone data for an input image, said system having means for processing the incoming prepress contone data to yield screened color halftone separation data representing halftone separations that are to collectively form the proof image, and a marking engine for writing each of said halftone separations with proper registration so as to form said proof image, wherein said system generates a desired color in the halftone proof image from a plurality of different colorants, said system comprising:

in said processing means:

means for obtaining data representing a plurality of color contone separations of said input image, each of said separations having incoming contone values wherein corresponding ones of said incoming contone values for all of said separations collectively define a region in the output image that is to contain the desired color; and means for generating a halftone dot for each one of the incoming contone values in each of said separations having a selected size and solid are density wherein the size and solid area density of said halftone dot is related to said each one of the incoming contone values so as to form a plurality of component halftone dots; and in said marking engine:

means for printing spatially corresponding component halftone dots from each of said separations each with a corresponding one of said colorants in superposition in a selected order and in registration so as to form composite halftone dots which collectively depict said desired color.

32. The system in claim 31 wherein said generating means comprises:

means for modifying the incoming contone values contained in each one of the separations in accordance with a dot gain relationship in order to yield corresponding modified contone values, wherein said modified contone values contain a dot gain with respect to corresponding ones of said incoming contone values; and means for converting each of said modified contone values for each one of said separations into a halftone dot having a solid area density value so as to form said component dots for said one separation, wherein said solid area density value is a function of a separation color associated therewith.

33. The system in claim 32 wherein the printing means overlays a spatially corresponding one of said component halftone dots from at least of said separations to form a corresponding composite halftone dot.

34. The system in claim 33 wherein the marking engine is a sublimation dye transfer laser printer and said colorants comprise cyan, magenta, yellow and black colored donor sheets.

35. They system in claim 32 wherein said incoming contone values modifying means comprises:

a first look-up table containing stored values that collectively define a dot gain function for the separation color associated with said one separation; and means for applying each of said incoming contone values for said one separation through the first look-up table in order to produce corresponding ones of said modified contone values.

36. The system in claim 35 wherein said first look-up table comprises a plurality of separate dot gain look-up tables, wherein each one of the plurality of dot gain look-up tables stores a dot gain function for a different separation color; and wherein said incoming contone values applying means comprises means for routing each one of the incoming contone values for said one separation through the dot gain look-up table associated therewith.

37. The system in claim 36 wherein the marking engine is a sublimation dye transfer laser printer and said colorants comprise cyan, magenta, yellow and black colored donor sheets.

38. The system in claim 32 wherein said modified contone values converting means comprises means for varying intensity levels of a writer used to print each of said component halftone dots associated with said one separation in accordance with a solid area density relationship, wherein the solid area density relationship characterizes an exposure level for each writing spot that is to form said component halftone dot based on the separation color associated therewith and whether or not said each writing spot is to be darkened.

39. The system in claim 38 wherein said carrying means comprises:

a second look-up table containing stored values for the solid area density relationship for the separation color associated with said one separation; and means for applying each bit-mapped value for each of said component halftone dots through the second look-up table in order to produce corresponding ones of the intensity levels.

40. The system in claim 39 wherein said second look-up table comprises a plurality of separate solid area density look-up tables wherein each of the plurality of solid area density look-up tables stores a solid area density relationship for a different separation color; and wherein the bit-mapped values applying means comprises means for routing each one of the bit-mapped values for said one separation through the solid area density look-up table associated therewith.

41. The system in claim 40 wherein the marking engine is a sublimation dye transfer laser printer and said colorants comprise cyan, magenta, yellow and black colored donor sheets.

42. The method in claim 3 wherein the spatially corresponding component halftone dots from said separations are overlaid substantially concentrically.

43. The method in claim 14 wherein the spatially corresponding component halftone dots from said separations are overlaid substantially concentrically.

44. The method in claim 23 wherein the spatially corresponding component halftone dots from said separations are overlaid substantially concentrically.

45. The method in claim 24 wherein the spatially corresponding component halftone dots from said separations are overlaid substantially concentrically.

46. The method in claim 3 wherein the spatially corresponding component halftone dots are overlaid from all of said separations.

47. The method in claim 14 wherein the spatially corresponding component halftone dots from said separations are overlaid substantially concentrically.

48. The method in claim 23 wherein the spatially corresponding component halftone dots from said separations are overlaid substantially concentrically.

49. The method in claim 33 wherein the spatially corresponding component halftone dots from said separations are overlaid substantially concentrically.

* * * * *